United States Patent
Hao et al.

(10) Patent No.: US 11,994,934 B2
(45) Date of Patent: May 28, 2024

(54) FAILURE PREDICTION METHOD AND DEVICE FOR A STORAGE DEVICE

(71) Applicant: SAMSUNG ELECTRONICS CO., LTD., Suwon-si (KR)

(72) Inventors: Wenwen Hao, XiAn (CN); Yongwong Kwon, Gwangmyeong-si (KR); Na Liu, XiAn (CN); Yin Luo, XiAn (CN); Chankyu Koh, Seoul (KR); Lining Dou, XiAn (CN); Lu Wang, XiAn (CN); Young-Seop Shim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 17/867,086

(22) Filed: Jul. 18, 2022

(65) Prior Publication Data

US 2023/0141749 A1     May 11, 2023

(30) Foreign Application Priority Data

Nov. 9, 2021  (CN) .......................... 202111322071.X

(51) Int. Cl.
  *G06F 11/00*     (2006.01)
(52) U.S. Cl.
  CPC ................................. *G06F 11/008* (2013.01)
(58) Field of Classification Search
  CPC ... G06F 11/008; G06F 11/079; G06F 11/0793
  See application file for complete search history.

(56) References Cited

U.S. PATENT DOCUMENTS 9,189,309 B1 * 11/2015 Ma ........................ G06F 11/008
10,896,080 B2   1/2021 Wu et al.
(Continued)

FOREIGN PATENT DOCUMENTS

CN    103559115 A    2/2014
CN    108052528 A    5/2018
(Continued)

OTHER PUBLICATIONS

Murray JF, Hughes GF, Kreutz-Delgado K, Schuurmans D. "Machine Learning Methods for Predicting Failures in Hard Drives: A Multiple-Instance Application." Journal of Machine Learning Research. May 1, 2005. pp. 783-816. (Year: 2005).*

(Continued)

*Primary Examiner* — Joseph R Kudirka
(74) *Attorney, Agent, or Firm* — Sughrue Mion, PLLC

(57) ABSTRACT

A failure prediction method and device for a storage device are provided. The method comprises: inputting SMART data of the storage device obtained in real time into each of a plurality of base classification models to obtain a classification result for the SMART data of the storage device obtained in real time that is output by the each classification model, wherein the each base classification model is obtained by training using historical SMART data of a plurality of storage devices and/or SMART data of the plurality of storage devices obtained online; determining whether the SMART data of the storage device obtained in real time is healthy data or erroneous data, based on classification results of the plurality of base classification models; predicting whether the storage device will fail, based on a number of SMART data that is determined as healthy data and a number of SMART data that is determined as erroneous data among SMART data of the storage device obtained within a predetermined time window.

14 Claims, 18 Drawing Sheets

(56) References Cited

U.S. PATENT DOCUMENTS 10,996,861 B2 5/2021 Liu et al.
2020/0104200 A1 4/2020 Kocberber et al.

FOREIGN PATENT DOCUMENTS

| CN | 108304287 A | 7/2018 |
| CN | 108986869 A | 12/2018 |
| CN | 111782491 A | 10/2020 |
| CN | 111949459 A | 11/2020 |
| CN | 112000288 A | 11/2020 |
| CN | 112214369 A | 1/2021 |
| CN | 112395179 A | 2/2021 |

OTHER PUBLICATIONS

Li et al., "Hard Drive Failure Prediction Using Classification and Regression Trees," IEEE, Computer Society, 2014 44th Annual IEEE/IFIP International Conference on Dependable Systems and Networks, pp. 383-394, 2014.

Xu et al., "Health Status Assessment and Failure Prediction for Hard Drives with Recurrent Neural Networks," Journal of Latex Class Files, vol. 13, No. 9, Sep. 2014, Published in IEEE Transactions on Computers, vol. 65, No. 11, Nov. 2016 ("Citation information: DOI 10.1109/TC.2016.2538237, IEEE Transactions on Computers"), Total 8 pages.

Zhu et al., "Proactive Drive Failure Prediction for Large Scale Storage Systems," 2013 IEEE 29th Symposium on Mass Storage Systems and Technologies (MSST), 2013, Total 5 pages.

Narayanan et al., "SSD Failures in Datacenters: What? When? and Why?" ACM, 9th ACM International Systems and Storage Conference, 2016, Total 11 pages.

* cited by examiner

FAILURE PREDICTION METHOD AND DEVICE FOR A STORAGE DEVICE

CROSS-REFERENCE TO RELATED APPLICATION(S)

This application claims priority from Chinese Patent Application No. 202111322071.X, filed on Nov. 9, 2021, in the China National Intellectual Property Administration (CNIPA), the disclosure of which is incorporated by reference herein in its entirety.

BACKGROUND

Technical Field

The present disclosure relates to a field for storage technology, and more specifically, to a failure prediction method and device for a storage device.

Description of the Related Art

With the development of storage technology, a large number of storage devices are widely used. If a storage device fails, it may cause huge losses to a user. For example, a flash-based solid-state drive (SSD), as a high-performance storage medium, has replaced traditional mechanical hard drives and is widely used in large-scale data centers. Unfortunately, an increase in flash memory density in recent years has also reduced reliability of an SSD, for example, the failure of SSDs in the data center can lead to downtime and even data loss. Therefore, if the failure of an SSD is predicted in advance and the corresponding treatment is carried out, stability of the data center can be guaranteed, thereby reducing the loss of the user. Self-Monitoring, Analysis, and Reporting Technology (SMART) data refers to a status report generated by an internal manager of a hard disk through monitoring and analysis of the hard disk itself, and the status report can comprise various information for monitoring hard disk health level and hard disk anomaly, so a failure for an SSD can be predicted by analyzing the SMART data. Methods for predicting a failure of an SSD based on the SMART data of related technologies are generally not suitable for SSDs, require suppliers to provide a normal range of SMART attribute values based on prior knowledge in the professional field, and currently have problems due to unbalanced training positive and negative samples and aging of a prediction model, which limit an improvement of accuracy of a failure prediction. Therefore, providing a solution that can improve the accuracy of the failure prediction of a storage device has become a problem that needs to be solved urgently.

SUMMARY

An aspect of the present disclosure is to provide a failure prediction method and device for a storage device, so as to at least solve the above-mentioned problems in the related art, and may not solve any of the above-mentioned problems.

According to an aspect of exemplary embodiments of the present disclosure, there is provided a failure prediction method for a storage device, the method includes: inputting SMART data of the storage device obtained in real time into each of a plurality of base classification models to obtain a classification result for the SMART data of the storage device obtained in real time that is output by the each classification model, wherein each base classification model is obtained by training using historical SMART data of a plurality of storage devices and/or SMART data of the plurality of storage devices obtained online; determining whether the SMART data of the storage device obtained in real time is healthy data or erroneous data, based on classification results of the plurality of base classification models; predicting whether the storage device will fail, based on a number of SMART data that is determined as healthy data and a number of SMART data that is determined as erroneous data among SMART data of the storage device obtained within a predetermined time window.

The failure prediction method for the storage device according to the embodiment of the present disclosure, a robustness of a prediction result can be effectively improved by predicting the failure for the storage device based on a classification of a plurality of SMART data acquired within a predetermined time window.

Alternatively, each base classification model is an initial base classification model that is obtained by training using all of erroneous data in the historical SMART data of the plurality of storage devices and a first subset of healthy data corresponding to the each base classification model among the historical SMART data, wherein the healthy data in the historical SMART data is divided into a plurality of first subsets, wherein the plurality of first subsets do not cross each other.

A prediction solution based on majority class under-sampling ensemble learning can effectively improve a performance of SSD failure prediction by solving the problem of an unbalanced distribution of healthy/erroneous data in SMART data.

Alternatively, wherein each base classification model is an updated base classification model that is obtained through training and updating the initial base classification model by using SMART data of the plurality of storage devices obtained online, wherein, training data used to obtain the each updated classification model is a second subset corresponding to each updated classification model of the earliest obtained SMART data in a SMART data queue for storage device in a healthy state among the plurality of storage devices which was recently acquired before current time, and SMART data in a SMART data queue for storage device in a failure state among the plurality of storage device which was recently acquired before the current time, wherein the SMART data queue has a predetermined size, wherein the earliest obtained SMART data in the SMART data queue for storage device in the healthy state among the plurality of storage device that was recently acquired before the current time is divided into a plurality of second subsets which do not cross each other.

The present disclosure applies online learning strategies to SSD failure prediction tasks to solve the problem of model aging and uses an SSD solution of majority class under-sampling integrated learning to solve the problem of imbalance for healthy/erroneous data in the SMART data, thereby effectively improving the prediction performance with respect to SSD failure.

Alternatively, the each base classification model is a Long Short-Term Memory (LSTM) model.

Alternatively, the method further includes obtaining the each base classification model through training or receiving each trained base classification model from an external device.

Alternatively, the predicting whether the storage device will fail includes determining that the storage device will fail, when the number of the SMART data determined as the erroneous data is greater than the number of the SMART data determined as the healthy data within the predetermined time window; and/or, determining that the storage device will not fail, when the number of the SMART data determined as the erroneous data is not greater than the number of the SMART data determined as the healthy data within the predetermined time window.

A robustness of a prediction result can be effectively improved by predicting the failure for the storage device based on a classification of a plurality of SMART data acquired within a predetermined time window.

According to another aspect of exemplary embodiments of the present disclosure, there is provided a failure prediction device for a storage device, including a classification unit, configured to input SMART data of the storage device obtained in real time into each of a plurality of base classification models to obtain a classification result for the SMART data of the storage device obtained in real time that is output by the each classification model, wherein the each base classification model is obtained by training using historical SMART data of a plurality of storage devices and/or SMART data of the plurality of storage devices obtained online; an initial determination unit, configured to determine whether the SMART data of the storage device obtained in real time is healthy data or erroneous data, based on classification results of the plurality of base classification models; a final determination unit, configured to predict whether the storage device will fail, based on a number of SMART data that is determined as healthy data and a number of SMART data that is determined as erroneous data among SMART data of the storage device obtained within a predetermined time window.

The failure prediction device for the storage device according to the embodiment of the present disclosure, a robustness of a prediction result can be effectively improved by predicting the failure for the storage device based on a classification of a plurality of SMART data acquired within a predetermined time window.

Alternatively, each base classification model is an initial base classification model that is obtained by training using all of erroneous data in the historical SMART data of the plurality of storage devices and a first subset of healthy data corresponding to the each base classification model among the historical SMART data, wherein the healthy data in the historical SMART data is divided into a plurality of first subsets which do not cross each other.

A prediction solution based on majority class under-sampling ensemble learning can effectively improve a prediction performance of SSD failure by solving the problem of an unbalanced distribution of healthy/erroneous data in SMART data.

Alternatively, wherein each base classification model is an updated base classification model that is obtained by training and updating the initial base classification model using SMART data of the plurality of storage devices obtained online, wherein, training data used to obtain each updated classification model is a second subset corresponding to the each updated classification model of the earliest obtained SMART data in a SMART data queue for storage device in a healthy state among the plurality of storage device that was recently acquired before current time, and SMART data in a SMART data queue for storage device in a failure state among the plurality of storage device that was recently acquired before current time, wherein the SMART data queue has a predetermined size, wherein the earliest obtained SMART data in the SMART data queue for storage device in the healthy state among the plurality of storage device that was recently acquired before the current time is divided into a plurality of second subsets, and the plurality of second subsets do not cross each other.

The present disclosure applies online learning strategies to SSD failure prediction tasks to the problem of model aging and uses an SSD solution of majority class under-sampling integrated learning to solve the problem of imbalance for healthy/erroneous data in the SMART data, thereby effectively improving the prediction performance with respect to SSD failure.

Alternatively, the each base classification model is a Long Short-Term Memory (LSTM) model.

Alternatively, the failure prediction device further includes a training unit, configured to obtain the each base classification model through training, or a receiving unit, configured to receive each trained base classification model from an external device.

Alternatively, the final determination unit is configured to determine that the storage device will fail, when the number of SMART data determined as the erroneous data is greater than the number of SMART data determined as the healthy data within the predetermined time window; and/or, determine that the storage device will not fail, when the number of SMART data determined as the erroneous data is not greater than the number of SMART data determined as the healthy data within the predetermined time window.

A robustness of a prediction result can be effectively improved by predicting the failure for the storage device based on a classification of a plurality of SMART data acquired within a predetermined time window.

According to another aspect of exemplary embodiments of the present disclosure, there is provided a failure prediction system for storage devices, including a plurality of storage devices; a classification unit, configured to input SMART data of a storage device of the plurality of storage devices obtained in real time into each of a plurality of base classification models to obtain a classification result for the SMART data of the storage device obtained in real time that is output by the each classification model, wherein the each base classification model is obtained by training using historical SMART data of the plurality of storage devices and/or SMART data of the plurality of storage devices obtained online; an initial determination unit, configured to determine whether the SMART data of the storage device obtained in real time is healthy data or erroneous data, based on classification results of the plurality of base classification models; a final determination unit, configured to predict whether the storage device will fail, based on a number of SMART data that is determined as healthy data and a number of SMART data that is determined as erroneous data among SMART data of the storage device obtained within a predetermined time window.

According to an aspect of the present disclosure, there is provided a electronic device including a memory configured to store one or more instructions; a plurality of storage devices; and a main processor, configured to execute the one or more instructions to perform the failure prediction method of the storage device as described above.

According to an aspect of the present disclosure, there is provided a host storage system, including a host, including a host memory and a host controller; and a storage device, wherein, the host memory stores instructions, when executed by the host controller, performing the failure prediction method for the storage device as described above.

According to an aspect of the present disclosure, there is provided a Universal Flash Storage(UFS) system, including a UFS device; a UFS host; and a UFS interface, used for a communication between the UFS device and the UFS host, wherein, the UFS host is configured to performing the failure prediction method for the storage device as described above.

The storage system and the UFS system according to the embodiment of the present disclosure, a robustness of a prediction result can be effectively improved by predicting the failure for the storage device based on a classification of a plurality of SMART data acquired within a predetermined time window.

According to an embodiment of the present disclosure, there is provided a storage system, including a storage device, including a plurality of non-volatile memories (NVMs); and a memory controller, configured to performing the failure prediction method for the storage device as described above.

According to an embodiment of the present disclosure, data center system, including a plurality of application servers; and a plurality of storage servers, wherein each storage server includes a storage device, wherein, one of the plurality of application servers is configured to execute the failure prediction method for the storage device as described above.

According to another aspect of an exemplary embodiment of the present disclosure, there is provided a computer-readable storage medium storing a computer program, when executed by a processor, causing the processor to implement the failure prediction method for the storage device as described above.

In an exemplary embodiment of the present disclosure, there is provided a failure prediction method for a storage device, including: inputting Self-Monitoring, Analysis, and Reporting Technology (SMART) data of the storage device obtained in real time, into each of a plurality of base classification models; obtaining a plurality of classification results from the plurality of base classification models, for the SMART data of the storage device, wherein each of the plurality of base classification models is obtained by training using at least one of historical SMART data of a plurality of storage devices or SMART data of the plurality of storage devices obtained through a network; determining whether the SMART data of the storage device obtained in real time indicates healthy data or erroneous data, based on the plurality of classification results of the plurality of base classification models; and predicting whether the storage device will fail, based on a number of SMART data that is determined as the healthy data and a number of SMART data that is determined as the erroneous data among SMART data of the storage device obtained within a predetermined time window.

According to another exemplary embodiment of the present disclosure, disclosed is a failure prediction device for a storage device, including: failure prediction device for a storage device, including: a classification unit configured to input Self-Monitoring, Analysis, and Reporting Technology (SMART) data of the storage device obtained in real time into each of a plurality of base classification models to obtain a classification result for the SMART data of the storage device obtained in real time that is output by the each classification model, wherein the each base classification model is obtained by training using at least one of historical SMART data of a plurality of storage devices or SMART data of the plurality of storage devices obtained through a network; an initial determination unit configured to determine whether the SMART data of the storage device obtained in real time is healthy data or erroneous data, based on classification results of the plurality of base classification models; and a final determination unit configured to predict whether the storage device will fail, based on a number of SMART data that is determined as the healthy data and a number of SMART data that is determined as the erroneous data among SMART data of the storage device obtained within a predetermined time window.

BRIEF DESCRIPTION OF THE DRAWINGS

The above and other purposes and features of the present disclosure will become more apparent from the following description taken in conjunction with the accompanying drawings, wherein.

DETAILED DESCRIPTION OF EXEMPLARY EMBODIMENTS

Figure 1:
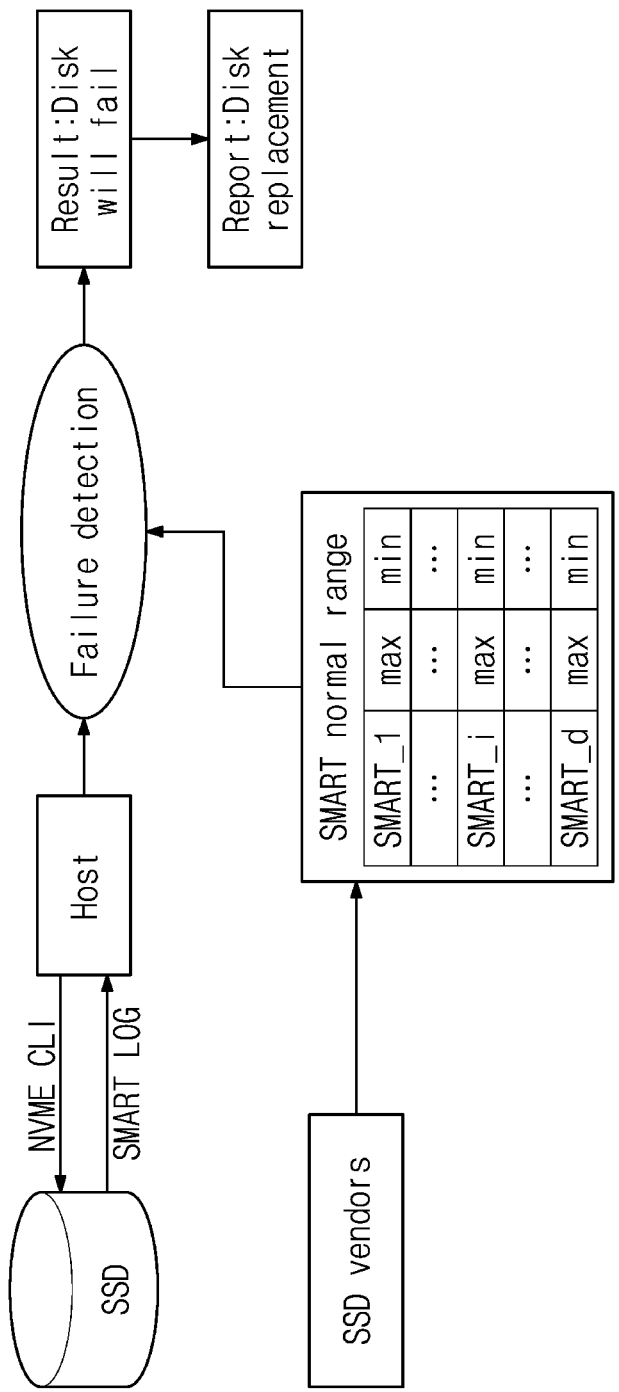
FIG. 1 is a flowchart illustrating an example of predicting SSD failure based on a threshold method.

Hereinafter, various embodiments of the present disclosure are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "comprise," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

In order to better understand the present disclosure, failure prediction methods for a storage device existing in the related art are described, firstly. Failure prediction methods for a storage device in related technologies include the following:

1) A Threshold Method

FIG. 1 is a flowchart illustrating an example of predicting an SSD failure based on the threshold method. Referring to FIG. 1, when the threshold method is used for failure prediction, a SMART attribute value of an SSD is periodically obtained to determine whether the obtained SMART attribute value exceeds a preset range of the SMART attribute value. If the SMART attribute value at a certain moment is greater than a maximum value of the preset range of the SMART attribute value, or is less than a minimum value of the preset range of the SMART attribute value, a failure warning will be issued.

Those skilled in the art should understand that the SMART attribute described herein has the same or similar meaning as the term "SMART attribute" in the related art. For example, the SMART attribute may include temperature·time (Temp·Time). Those skilled in the art should understand that the type of the SMART attribute may be selected by the user as required. For example, the SMART attribute may include a single type of attribute or multiple types of attributes.

The threshold method is a failure prediction method proposed for a Hard Disk Drive (HDD). The HDD is a mechanical hard disk and its failure is generally expressed as an abnormality of a single SMART attribute value or several SMART attribute values, while an SSD has no mechanical parts and failure manifestation thereof is more concealed. Therefore, it is not suitable for the threshold method proposed for HDD to be applied directly to SSD for failure prediction. If it is applied to an SSD for failure prediction, the accuracy of the failure prediction is relatively low, and a detection rate of an SSD failure is usually is at 3%-10% in an actual operating environment. On the other hand, due to the different workloads of different data centers, the preset ranges of a SMART attribute value of an SSD in different data centers are also quite different. Therefore, it is difficult to determine whether an SSD is in a failure state based on a value of a single SMART attribute or values of a few SMART attributes.

2) A Classification Algorithm Based on Machine Learning

In order to improve a prediction accuracy based on the SMART data, some researchers try to use the classification algorithm based on the machine learning. Specifically, a failure prediction model is established, and the failure prediction model is trained based on the SMART data of a storage device, so that the trained failure prediction model is used to predict a failure of the storage device. The classification algorithm based on the machine learning mainly comprises the following two methods:

i) A Machine Learning Algorithm Based on a Tree Structure

This algorithm is one of supervised learning methods that are commonly used. A random forest is a commonly used failure detection algorithm based on a tree structure for a storage device (for example, SSD).

Figure 2:
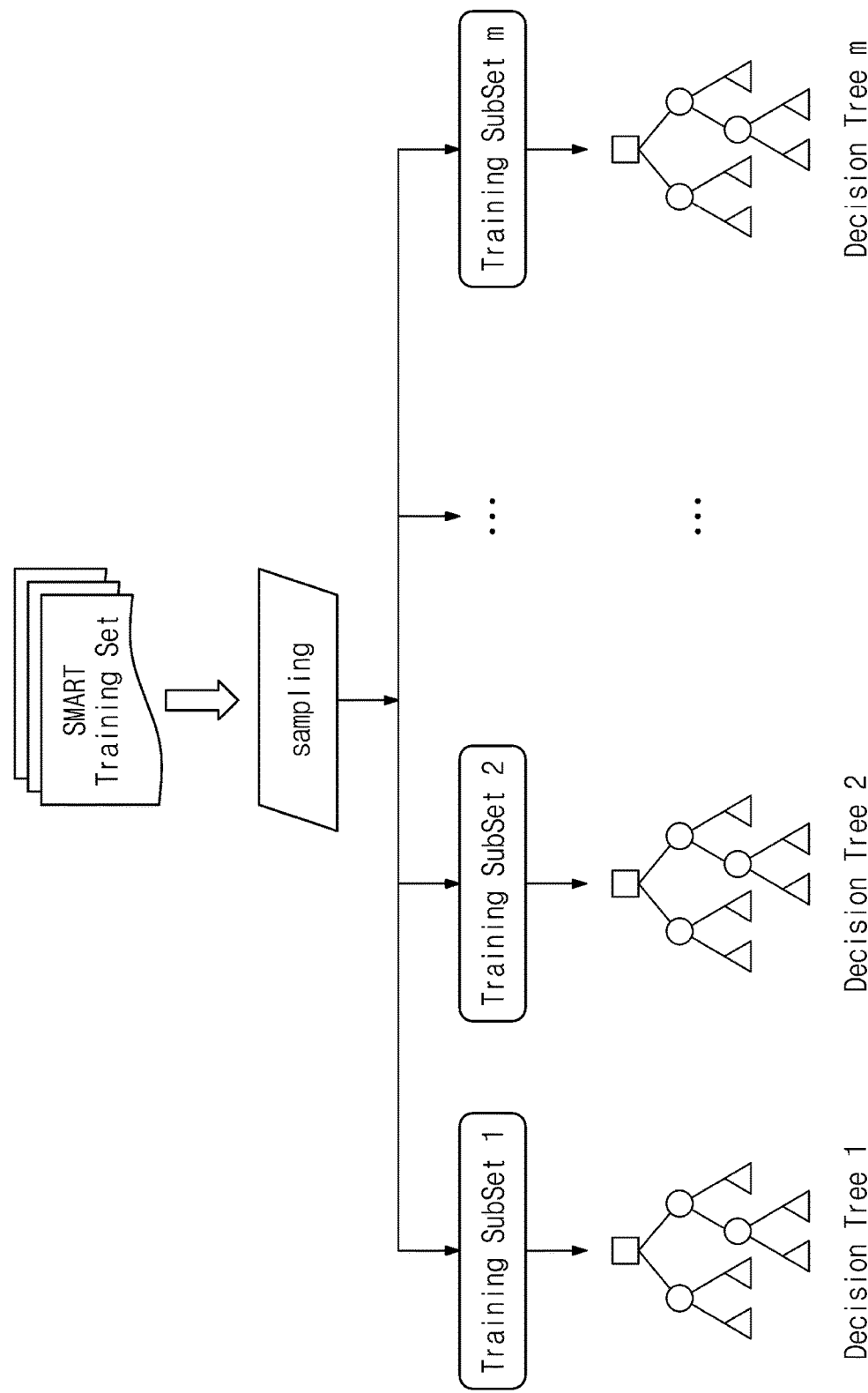
FIG. 2 is a diagram illustrating an example of a machine learning algorithm based on a tree structure.

FIG. 2 is a diagram illustrating an example of a machine learning algorithm based on a tree structure. Referring to FIG. 2, the core idea of the random forest is: re-sampling a training set to form multiple training subsets, each subset generating a decision tree to form the random forest, and all decision trees making decisions by voting. The failure prediction model based on the random forest selects the historical SMART data of the storage device as a training set, generates multiple sub-data sets by sampling the training set, and builds decision trees on the generated sub-data sets using a decision tree algorithm, all of which trees are combined to form the failure prediction model based on the random forest. In predicting, the test SMART data is input into the decision trees, and decision tree nodes are traversed according to the SMART attribute value to obtain prediction results of the decision trees in the random forest and finally, the results of all the decision trees are statistically voted to obtain the failure prediction result for the storage device.

ii) A classification method based on Long Short-Term Memory Network (LSTM)

The LSTM is a special RNN (Recurrent Neural Network), which has good support for long-term dependence. A distribution of the SMART attribute values of the storage device has a certain change trend over time, so this feature can be applied to the failure prediction of the storage device.

Figure 3:
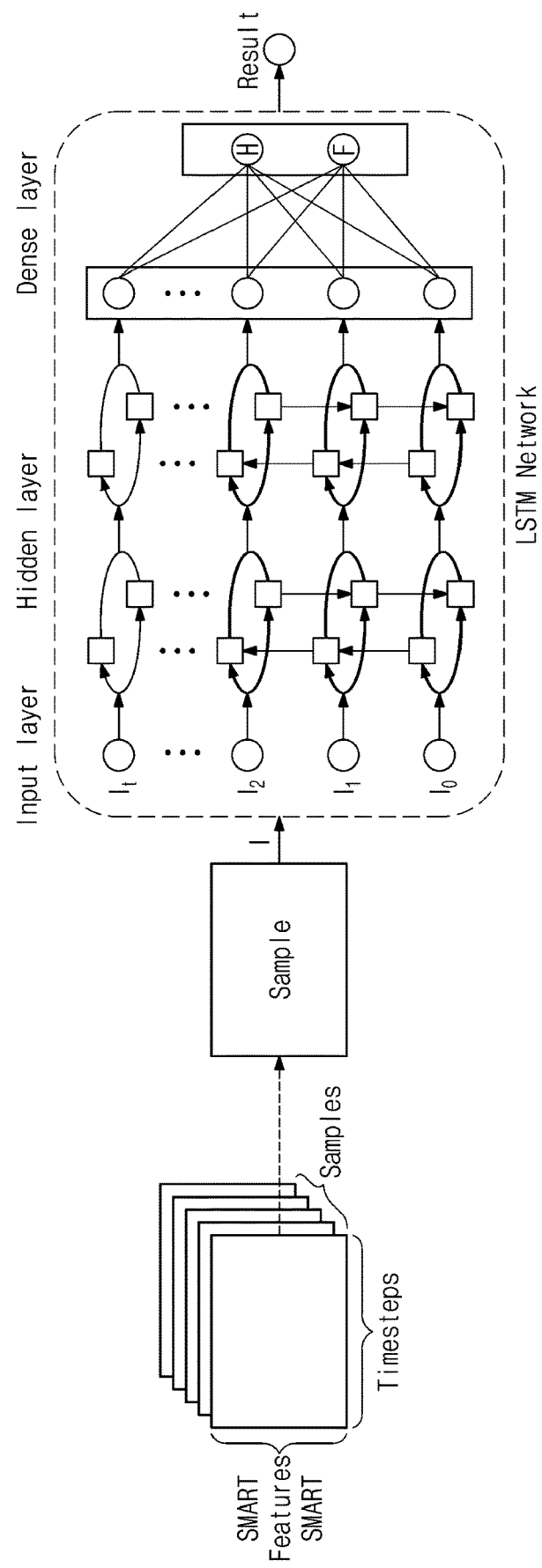
FIG. 3 is a diagram illustrating an example of a classification method based on LSTM.

FIG. 3 is a diagram illustrating an example of a classification method based on the LSTM. Referring to FIG. 3, first, SMART data samples are divided into slices according to time to construct timing data, then the constructed timing data is delivered to the LSTM to pass through an input Layer, a hidden Layer, and a dense Layer, and finally a prediction result is obtained.

The classification algorithm based on the machine learning uses the historical SMART data of the storage device in the data center to train the classification model to predict the SSD failure, so as to use the correlation between the SMART attributes to improve the failure prediction accuracy for the SSD, but there are two problems. On the one hand, the classification algorithm based on the machine learning usually performs model training in an offline mode, and the model will not change afterwards. However, in practical applications, the distribution of the SMART attribute values will change over time, and thus, when performing the failure prediction for the SSD adopting the classification algorithm based on the machine learning, a problem that the model ages and the detection accuracy will decrease over time occurs. For example, as the business types and business volume of the data center change, the SMART attribute value as an important failure warning indicator, such as a variation range of the temperature, also changes over time. The temperature distribution in a normal state of the online SMART data will gradually coincide with the temperature distribution in a failure state of the offline SMART data (that is, the distribution of temperature data obtained in real time when the SSD device is working normally is similar to the distribution of temperature data obtained previously when the SSD device failed), so the failure prediction accuracy for online data of the prediction model trained on offline data declines with time as the temperature distribution changes. On the other hand, since the failure rate of the SSD is much lower than that of the mechanical hard drive, there is usually a problem that positive samples and negative samples of the training data are significantly unbalanced and data of failed SSD is significantly insufficient. The prediction accuracy rate for the failure of the SSD of the model trained on such a training set is relatively low.

3) Transfer Learning

Figure 4:
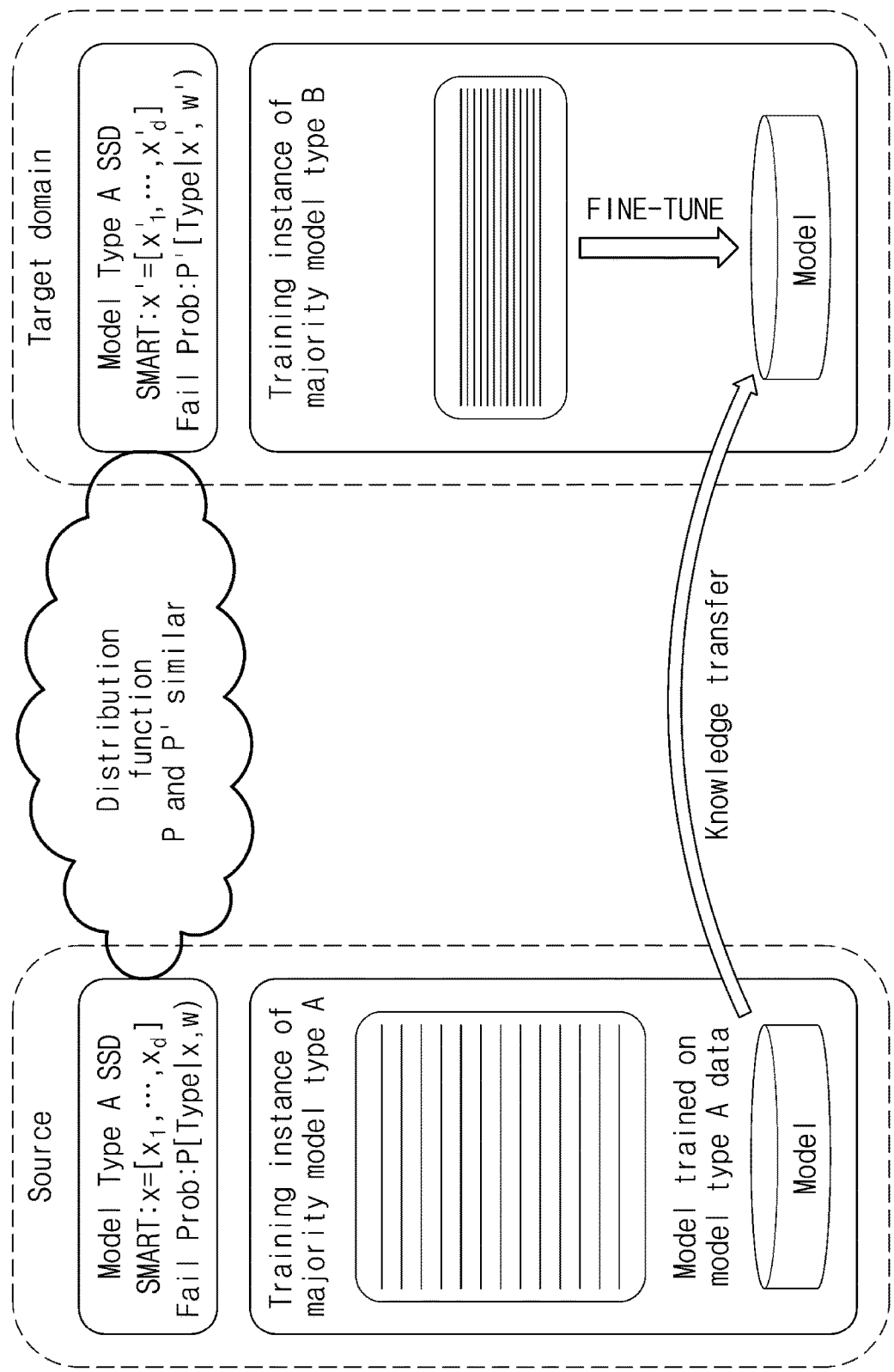
FIG. 4 is a diagram illustrating an example based on transfer learning.

The transfer learning is a machine learning technology that applies a model trained in a certain task to another prediction task. FIG. 4 is a diagram illustrating an example based on the transfer learning. Referring to FIG. 4, the transfer learning uses a model trained on a data set of SSDs of model A for SSDs of model B for failure prediction. Wherein, the SSDs of model A have a large amount of SMART historical data, and the SSDs of model B do not have enough SMART historical data. The application of transfer learning to SSD failure prediction is mainly to solve the problem that a newly launched model of SSD has no sufficient SMART historical data in model training. When using the transfer learning to improve the failure detection performance for the SSD, the SMART data of model A and the SMART data of model B are required to have similar distributions.

As mentioned above, the transfer learning may solve the problem of serious lack of data of new model of SSDs, but the transfer learning requires a large amount of training data of another model of SSD, the SMART distribution of which is similar to that of a target SSD, but this is difficult to achieve, because even the SMART distributions of different types of SSDs produced by the same manufacturer are also different, and the distributions of SMART attribute values of the same type of SSDs in different data centers are different. Therefore, it is more difficult to use the transfer learning to improve the failure prediction accuracy for SSD.

Hereinafter, a failure prediction method for a storage device according to an embodiment of the present disclosure will be described.

Figure 5:
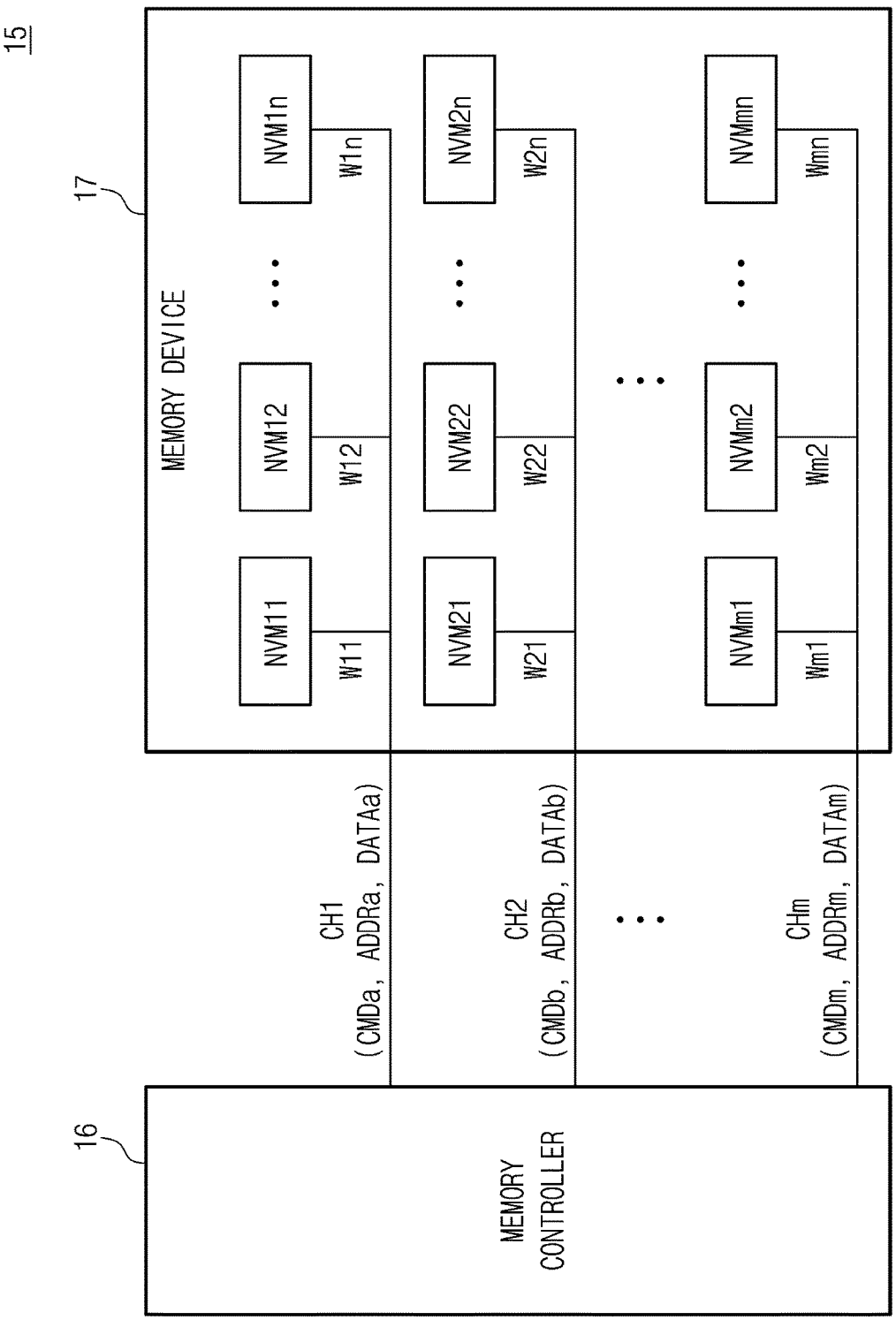
FIG. 5 is a block diagram illustrating a storage system 15 according to an embodiment of the present disclosure.

FIG. 5 is a block diagram of a memory system 15 according to an embodiment. Referring to FIG. 5, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of non-volatile memory (NVM) devices NVM11 to NVMmn. Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the inventive concept is not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1n connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM11 to NVM1n.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 5 illustrates an example in which the memory device 17 communicates with the memory controller 16 through m channels and includes n NVM devices corresponding to each of the channels, the number of channels and the number of NVM devices connected to one channel may be variously changed.

If it is not possible to predict in time that, for example, a NVM device in the storage device in FIG. 5 will fail, it may cause a downtime of entire storage system and even cause data loss when the NVM device fails.

Therefore, the method or system provided by the present disclosure can effectively predict the NVM device that will fail, thereby allowing corresponding measures to be taken.

Those skilled in the art should understand that the NVM device described in FIG. 5 may refer to a device including a NVM, for example, a mobile terminal PC, a laptop computer, a server, a media player, or an automobile device (for example, a navigation device).

For ease of description, a storage device in a data center is taken as an example for description. Those skilled in the art should understand that the storage device described herein can also refer to storage devices in other application scenarios. For example, SMART data of storage devices in the same model of mobile phones that are widely used can be obtained, whether the storage devices will fail is predicted, and a notification is sent to the corresponding mobile phone in advance to notify the user of the corresponding mobile phone.

Figure 6:
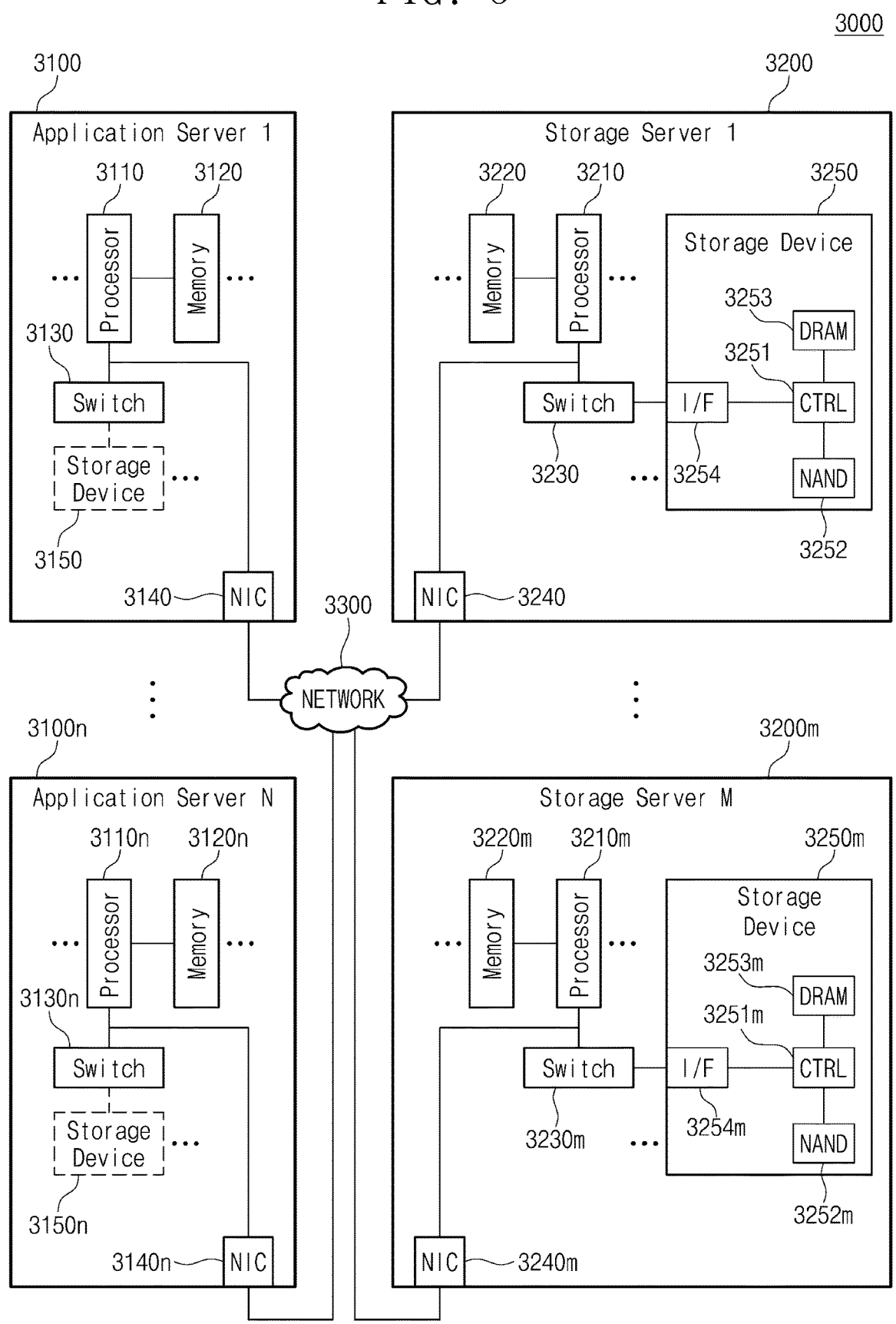
FIG. 6 is a diagram illustrating an example of a data center according to an embodiment of the present disclosure.

FIG. 6 is a diagram illustrating an example of a data center according to an embodiment of the present disclosure.

Referring to FIG. 6, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 31001 to 3100n and storage servers 32001 to 3200m. The number of application servers 31001 to 3100n and the number of storage servers 32001 to 3200m may be variously selected according to embodiments. The number of application servers 31001 to 3100n may be different from the number of storage servers 32001 to 3200m.

The application server 31001 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

During the operation of the data center, each storage device (storage server 3200/-3200m or storage device 3250/-3250m) will generate corresponding SMART data. Whether a corresponding storage device will fail may be effectively predicted by training and/or updating the failure prediction model using the historical SMART data generated by the storage device and/or the SMART data of the storage device obtained online???, and by inputting the test SMART data into the trained model. For ease of description, the following description is based on SSD-based storage devices. Therefore, those skilled in the art should understand that the methods and devices described below for SSD are also applicable to other existing types of non-volatile storage devices (for example, HHD) or volatile storage devices and new types of storage devices that will emerged with the development of technology. In addition, those skilled in the art should understand that SMART data, SMART attributes, or SMART information described below have the same or similar meanings.

Figure 7:
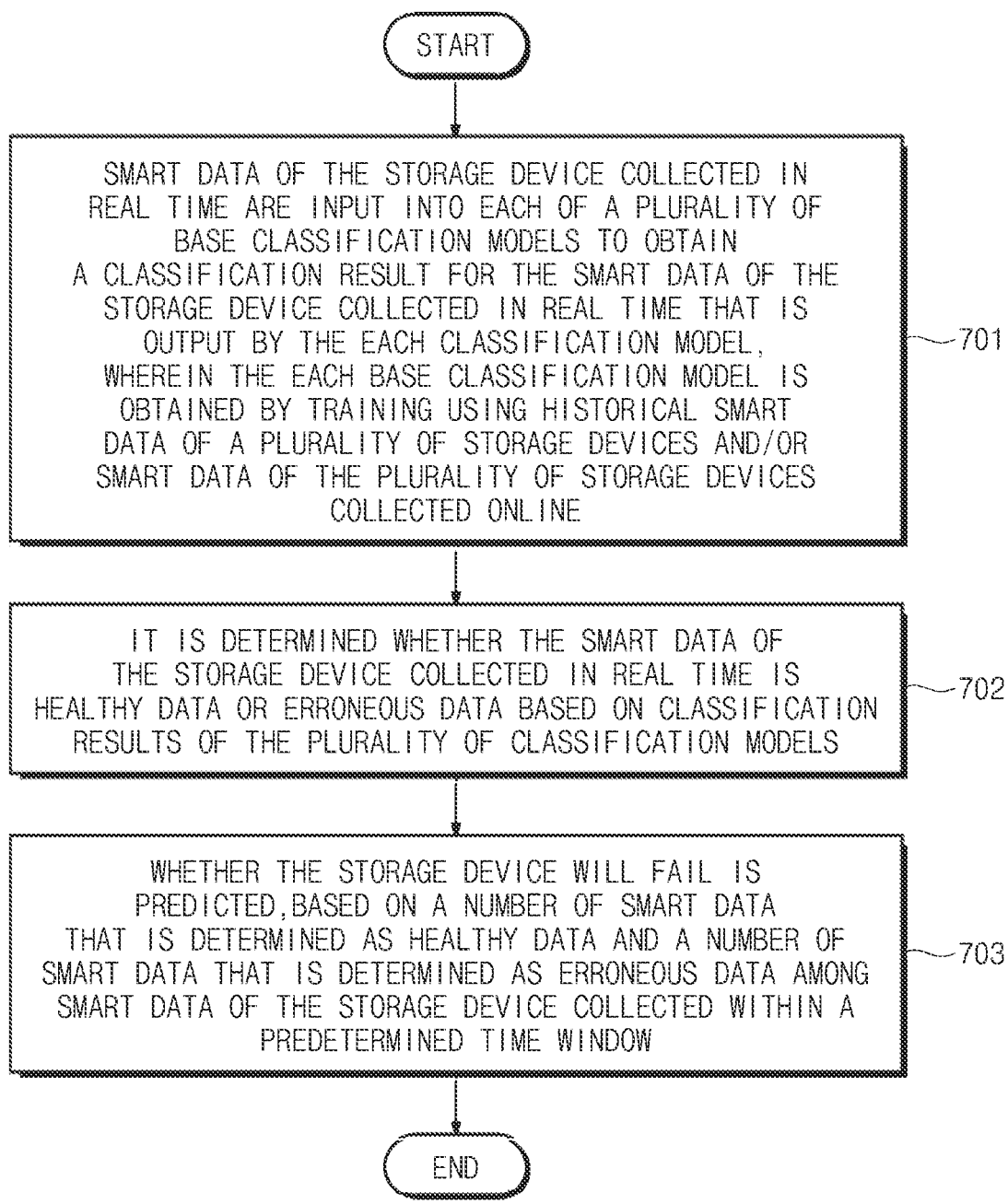
FIG. 7 is a flowchart of a failure prediction method for a storage device according to an embodiment of the present disclosure.

FIG. 7 is a flowchart illustrating a failure prediction method for a storage device according to an exemplary embodiment of the present disclosure.

Referring to FIG. 7, in operation S701, SMART data of the storage device obtained in real time are input into each base classification model of a plurality of base classification models to obtain a classification result for the SMART data of the storage device obtained in real time, that is output by the each classification model, wherein each base classification model is obtained by training using historical SMART data of a plurality of storage devices and/or SMART data of the plurality of storage devices obtained online, i.e., obtained through a network, from a server, or from a remote location.

Taking a data center using an SSD as a storage device as an example, since the failed disks account for only a small proportion of all SSDs in the data center, the ratio of failed SMART data with respect to healthy SMART data is significantly unbalanced. According to statistics, the ratio of healthy SMART data with respect to failed SMART data is about 1000:1, and thus the model obtained by training or updating on such an unbalanced data set has a very low accuracy in predicting an SSD failure.

The present disclosure solves the problem of imbalance between positive samples and negative training samples based on majority class under-sampling.

As an example, each base classification model is an initial base classification model that is obtained by training using all of erroneous data in the historical SMART data of the plurality of storage devices and a first subset of healthy data in the historical SMART data, wherein the healthy data in the historical SMART data is divided into a plurality of first subsets, wherein the plurality of first subsets do not cross or overlap each other.

Specifically, taking an SSD-based data center as an example, the collection of historical SMART data, i.e., regular collection of the SMART data of all SSDs in the data center, can take a long time for the operation and maintenance personnel of the data center. The obtained SMART data and SN (SSD Number) and collection time are stored in a file or database, and the data is marked manually. In other words, historical SMART data includes SMART data corresponding to healthy SSDs and SMART data corresponding to failed SSDs.

Since most of the SSDs in the data center are in a healthy state, there are far more healthy SMART data than failed SMART data. Those skilled in the art should understand that the healthy SMART data indicates SMART data corresponding to a healthy SSD, and the failed SMART data indicates SMART data corresponding to a failed SSD. Since the healthy SMART data is far more than the failed SMART data, if the healthy SMART data and the failed SMART data are directly used as positive samples and negative samples to directly train each base classification model, there will be a problem of imbalance between the positive samples and negative samples. Therefore, the healthy data may be divided into a plurality of subsets that do not cross or overlap each other, and respective subsets and all the failed SMART data may be used to train the corresponding base classification model, so that the positive samples and negative samples of the training data used by each base classification model are more balanced. For example, a first base classification model is trained using a first subset of the healthy data and all the erroneous data, a second base classification model is trained using a second subset of the healthy data and all the erroneous data.

The number of base classification models may be determined according to the ratio of the number of healthy SSDs with respect to the number of failed SSDs in the data center, or pre-set by the user. Since each base classification model corresponds to one subset, the number of subsets is equal to the number of base classification models.

As an example, an initial base classification model is obtained by training using historical SMART data. When the SMART data of the SSD obtained in real time is input to each initial base classification model, each initial base classification model will output a corresponding classification result. For example, the classification result indicates whether the input SMART data is healthy data or erroneous data. Since each base classification model is trained by using different subsets of healthy data, the output result of each base classification model may be different. For example, the output result of the first base classification model may indicate that the input SMART data is healthy data, while the output result of the second base classification model may indicate that the input SMART data is erroneous data.

As another example, each base classification model is an updated base classification model that is obtained by training and updating the initial base classification model using SMART data of the plurality of storage devices obtained online, wherein, training data used to obtain the each updated classification model is a second subset corresponding to the each updated classification model of the earliest obtained SMART data in a SMART data queue for storage device in a healthy state among the plurality of storage device that was recently acquired before current time, and SMART data in a SMART data queue for storage device in a failure state among the plurality of storage device that was recently acquired before current time, wherein the SMART data queue has a predetermined size, wherein the earliest obtained SMART data in the SMART data queue for storage device in the healthy state among the plurality of storage device that was recently acquired before the current time is divided into a plurality of second subsets, and the plurality of second subsets do not cross or overlap each other.

Since the distribution of SMART attributes changes over time due to changes in business types and business volumes, the initial base classification models trained with offline data sets (i.e., the set of historical SMART data) will experience a problem that the model ages and the prediction accuracy rate falls during the fault prediction process.

Therefore, in an incremental learning manner, the initial base classification models may be updated and trained using the SMART data of SSDs obtained online, so as to obtain updated base classification models, and the updated base classification models may be used to obtain more accurate classification results. The process of updating the initial base classification models is described below.

Firstly, the training data for training initial base classification model to obtain the updated base classification models are obtained online. The collection or acquisition of online data may represent the process of online annotating the continuously coming data and temporarily storing the continuously coming data in the SMART data pool during the online use of the model.

Figure 8:
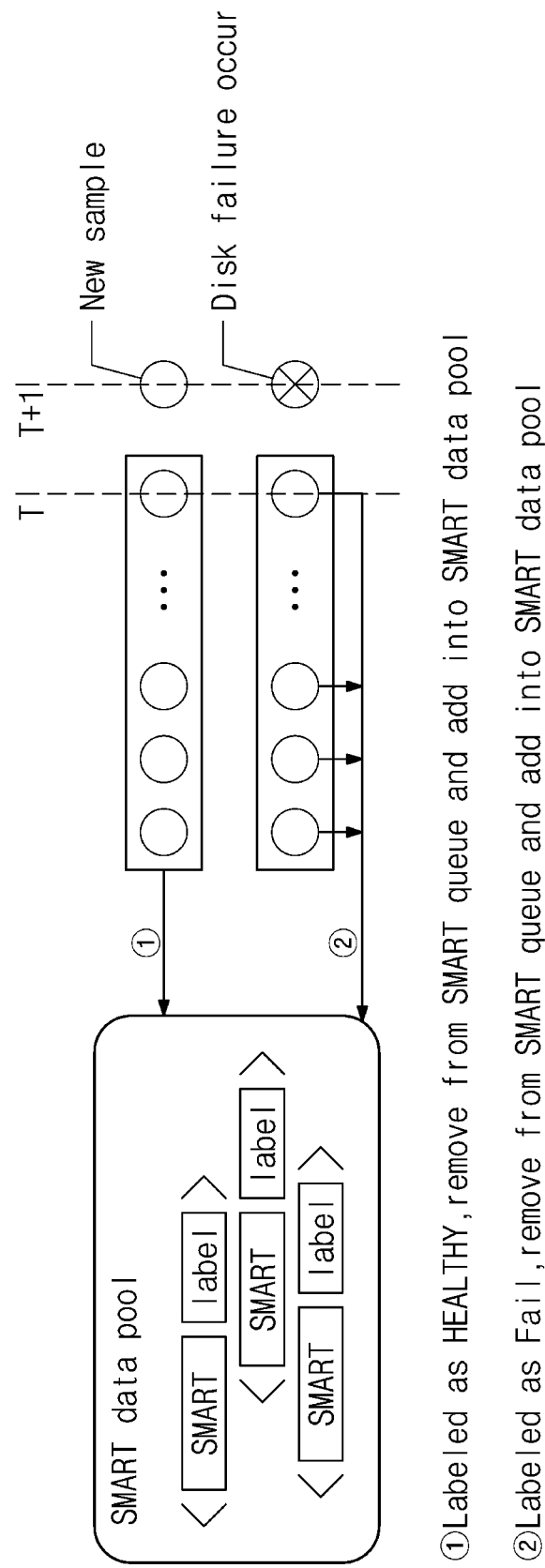
FIG. 8 is a diagram illustrating an example of online collection of training data for updating a base classification model.

FIG. 8 is a diagram illustrating an example of online collection of training data for updating the base classification models. Referring to FIG. 8, a fixed-size data queue may be set for each SSD (the size of the data queue is determined according to actual characteristics of data or is preset), SMART data is added to the queue in sequence according to the time sequence of collection, and the data in the queue is unmarked. Online data collection is a process of marking the data according to the state of the SSD at a next time to a time that the data was removed from the queue and adding the data to a sample pool. As shown in ① of FIG. 8, if the queue is full and new SMART data will arrive at the next moment, the earliest sample added to the queue is marked as "healthy" and removed from the queue and added to the sample pool. As shown in ② of FIG. 8, if an SSD failure will occur at the next moment, all SMART data in the queue corresponding to the SSD will be marked as "failed" and removed from the queue and added to the sample pool.

In other words, if the SSD is a failed SSD at the current time, all the SMART data in the data queue corresponding to the SSD that was obtained most recently before the current time are added to the data pool as erroneous data. If the SSD is a healthy SSD at the current time, the earliest obtained SMART data in the data queue corresponding to the SSD that was obtained most recently before the current time is added to the data pool as healthy SMART data. Since most of SSDs are in a healthy state during SSD operation, there are more healthy data in the data pool than erroneous data. Therefore, in order to ensure the balance of positive samples and negative samples, the healthy data in the data pool is divided into a plurality of subsets that do not cross or overlap each other, and the subsets and all the erroneous data in the data pool are used to train each initial base classification model. For example, a first subset and all the erroneous data in the data pool are used to train a first initial base classification model, and a second subset and all the erroneous data in the data pool are used to train a second initial base classification model, in order to obtain a updated first base classification model and an updated second base classification model respectively.

Those skilled in the art should understand that the above initial basic classification models and updated basic classification models indicate the basic classification models obtained by training with SMART data as input and classification result as output. The type of basic classification models may be LSTM or other machine learning models.

Figure 9:
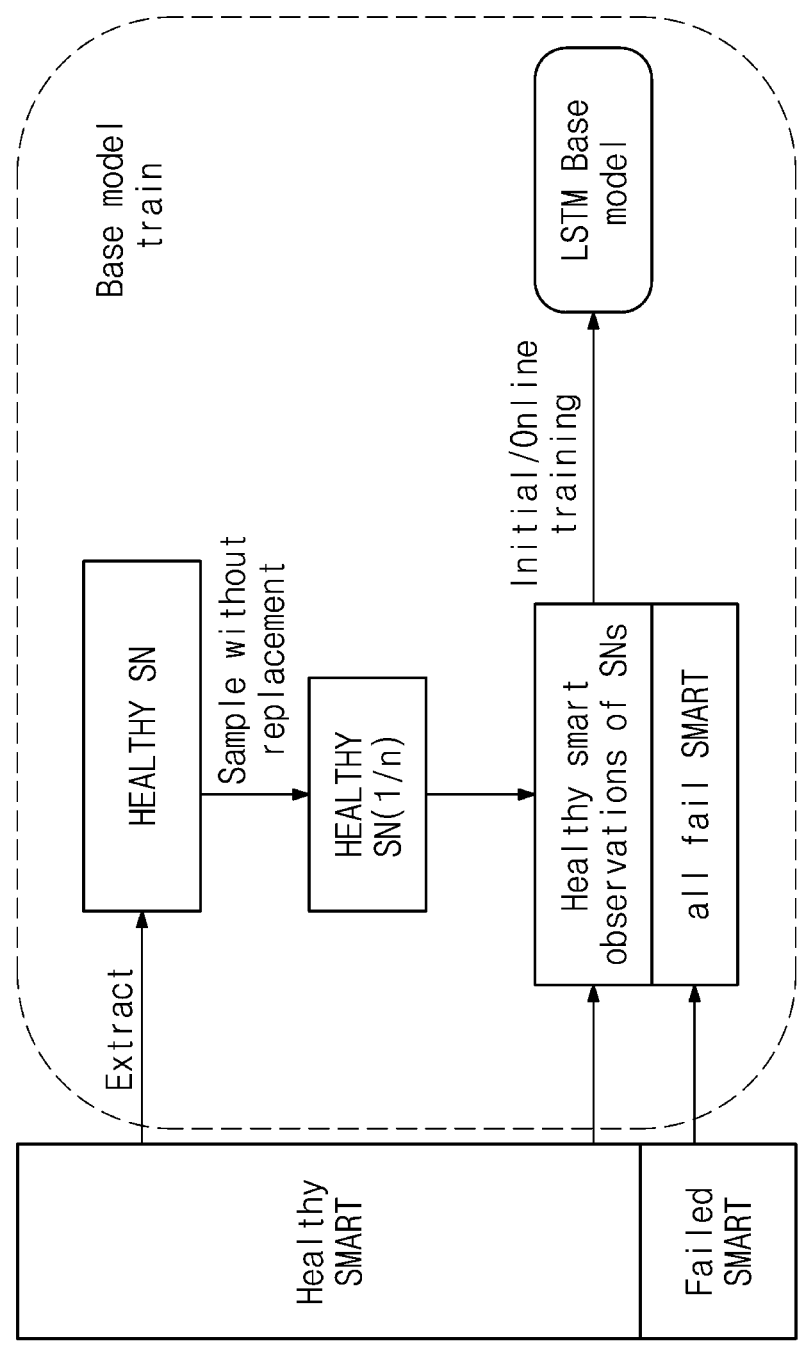
FIG. 9 is a diagram illustrating an example of acquiring an initial base classification model or an updated base classification model according to an embodiment of the present disclosure.

FIG. 9 is a diagram illustrating an example of acquiring an initial base classification model or an updated base classification model according to an embodiment of the present disclosure.

Referring to FIG. 9, under-sampling of the majority class samples is used to solve the problem of the imbalance of positive samples and negative samples in the training process of base classifiers, and a mutex subset of the majority class samples is selected for each base classifier through an integrated strategy in order to use all sample information in the training set.

As an example, the initial models and/or the updated models may be obtained through training by the failure prediction device, or the trained initial basic classification models and/or updated basic classification models may be received by the failure prediction device from an external device.

Returning to FIG. 7, in operation S702, it is determined whether the SMART data of the storage device obtained in real time is healthy data or erroneous data based on classification results of the plurality of classification models.

As mentioned above, because each base classification model uses different training data, the output results of respective base classification models may be different. Therefore, voting or other methods can be used to determine whether the input SMART data is healthy data or erroneous data based on the classification results of the plurality of base classification models. For example, if the classification results of most of base classification models indicate healthy SMART data, it is determined that the input SMART data is healthy data, and vice versa.

Figure 10:
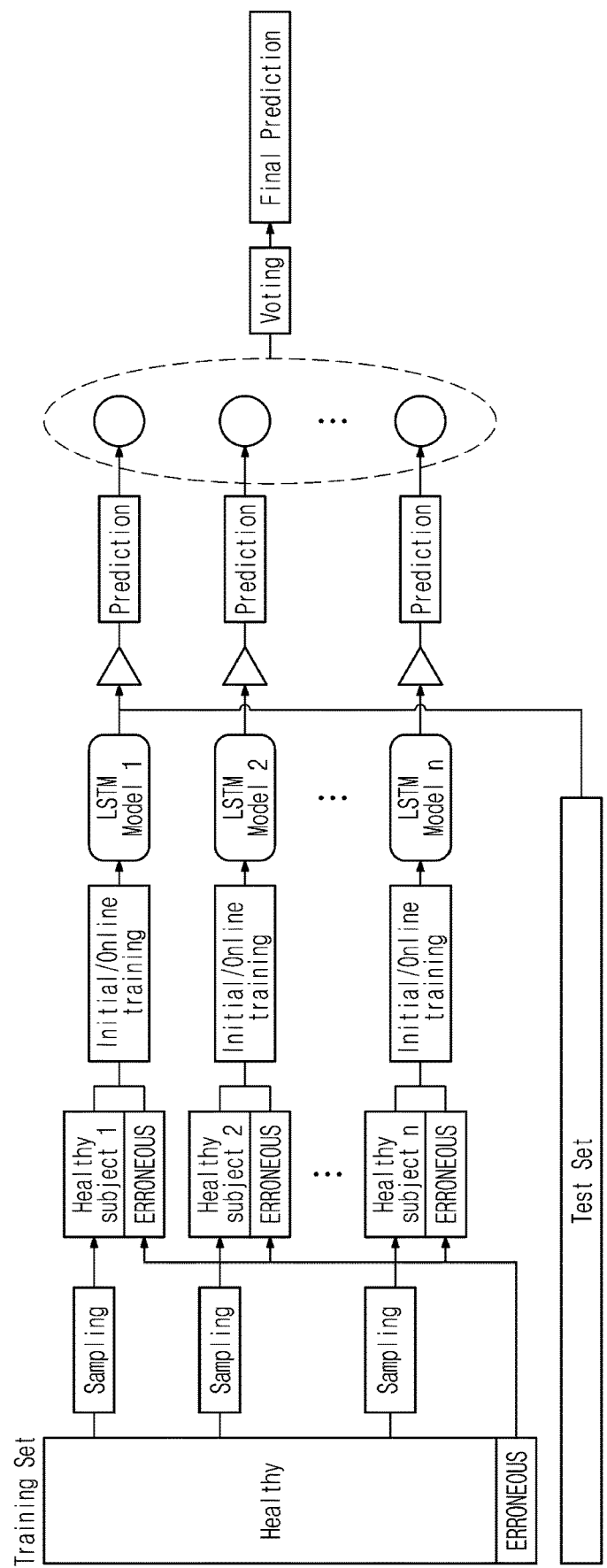
FIG. 10 is a diagram illustrating an example of predicting whether input SMART data is healthy data or erroneous data according to an embodiment of the present disclosure.

FIG. 10 is a diagram illustrating an example of predicting whether input SMART data is healthy data or erroneous data according to an embodiment of the present disclosure.

Referring to FIG. 10, this embodiment uses a LSTM as a base classification model, constructs a plurality of LSTM classification models in an integrated strategy, constructs a training set for each LSTM model with a method of majority-class under-sampling, and performs initial training or online adjustment of the models. The method of majority class under-sampling refers to selecting a part of the majority-class (i.e. healthy data) samples and all the minority-class (i.e. erroneous data) samples as a training set of a LSTM-based classification model in a under-sampling manner. n LSTM base classification models are constructed with an ensemble idea, and the prediction results of the n LSTM base classification models are merged by voting to predict SSD failures. For each LSTM base classifier, the training set of the initial or online training is constructed by randomly selecting 1/n of healthy data and all erroneous data in a sampling method, which, on the one hand, ensures a difference of different base classification models, and on the other hand, alleviates the problem of unbalanced sample proportions for healthy category and failed category.

In operation S703, whether the storage device will fail is predicted, based on a number of SMART data that is determined as healthy data and a number of SMART data that is determined as erroneous data among SMART data of the storage device obtained within a predetermined time window.

As an example, it is determined that the storage device will fail, when the number of the SMART data determined as the erroneous data is greater than the number of the SMART data determined as the healthy data within the predetermined time window; and/or, it is determined that the storage device will not fail, when the number of the SMART data determined as the erroneous data is not greater than the number of the SMART data determined as the healthy data within the predetermined time window.

According to the embodiment of the present disclosure, instead of predicting whether the SSD will fail based on the classification result of SMART data at a certain time, whether the SSD will fail is comprehensively judged based on the classification results of the SMART data acquired within a predetermined time window, so that the robustness of the prediction result can be improved.

Figure 11:
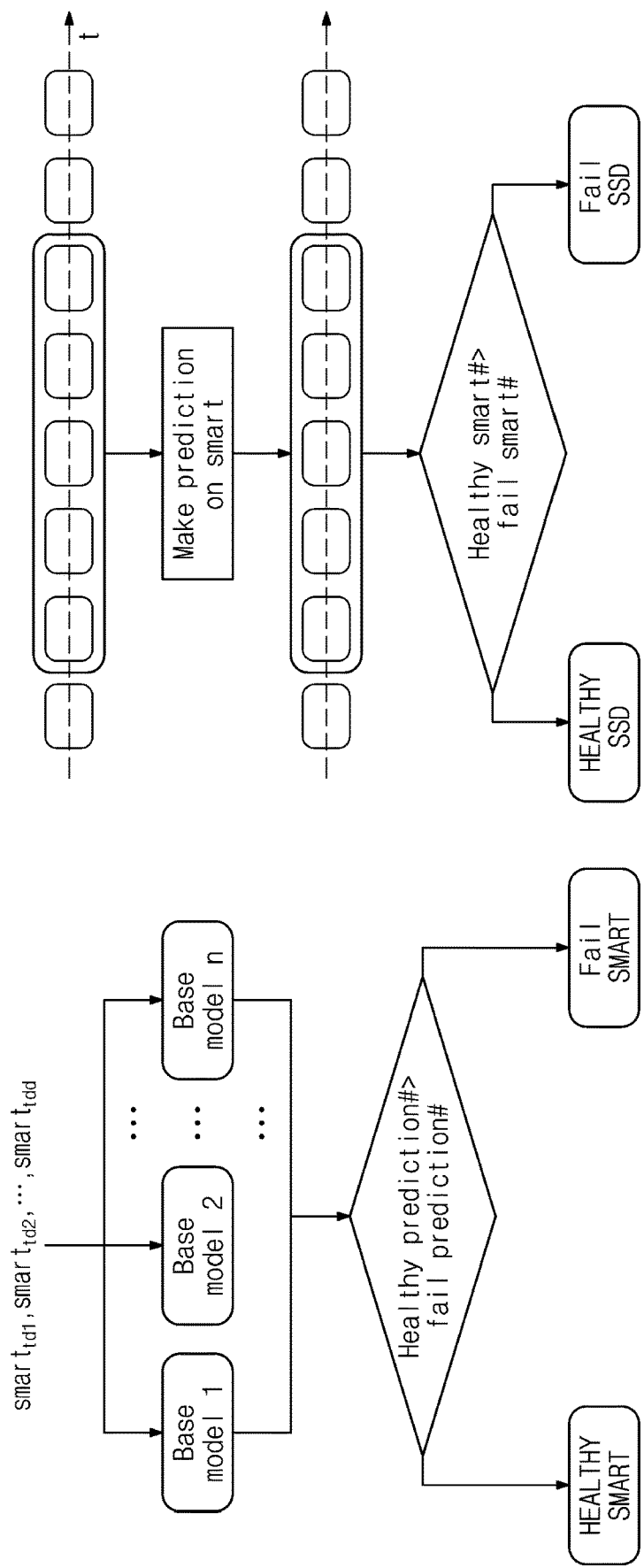
FIG. 11 is a schematic diagram illustrating an example of a failure prediction method for a storage device according to an embodiment of the present disclosure.

FIG. 11 is a schematic diagram illustrating an example of a failure prediction method for a storage device according to an embodiment of the present disclosure.

Referring to a) of FIG. 11, a type of the input SMART data is determined by a base classification model, and referring to b) of FIG. 11, whether the SSD will fail is predicted according to a number of the SMART data determined as healthy data and a number of the SMART data determined as erroneous data within a predetermined time window.

As described above, according to the embodiment of the present disclosure, the ensemble learning method based on the majority class under-sampling fully considers the problem of significant imbalance between the positive samples and negative samples of the data set during the online or initial training process, and combines the under-sampling strategy with the traditional ensemble learning algorithm to improve the performance for failure prediction.

Table 1 shows the relevant characteristics of the classification method according to the embodiment of the present disclosure and the classification method in the prior art.

TABLE 1

| | Single-classification model | Single classification model based on under-sampling | Classification model based on ensemble learning | Classification model based on majority class under-sampling ensemble learning |
|---|---|---|---|---|
| Usage of training samples | All of the samples | Part of the samples | All of the samples | All of the samples |
| Imbalance problem | Significant imbalance | Relative balance | Significant imbalance | Relative balance |

The SSD failure prediction algorithm based on the single-classification model uses all data sets to perform initial training or online update of a single model. Due to the distribution imbalance of positive samples and negative samples, the accuracy of the single-classification model for SSD failure prediction is very low.

The single-classification model based on under-sampling discards part of the majority class samples during the initial training or online update of the model, which alleviates the problem of imbalance between positive samples and negative samples. However, due to the use of under-sampling to discard a part of the training samples, information loss is caused, so it cannot achieve better failure prediction performance.

The SSD failure prediction method for classification model based on the ensemble learning constructs a plurality of base classification models, and selects different training samples for each base classification model. All samples participate in the training during the initial training or online update process, and a better performance than the single-classification model is obtained by fusing all the base classification models. However, the failure prediction method for classification model based on the ensemble learning still does not solve the problem of unbalanced distribution of positive samples and negative samples.

The SSD failure prediction method for classification model based on the majority class under-sampling ensemble learning constructs a plurality of base classification models by adopting an ensemble idea, selects a part of the majority class samples and all the minority class samples for each base classification model for performing initial training or online update to alleviate the problem of imbalanced distribution of positive samples and negative samples. At the same time, since each base classification model selects different subsets of the majority class samples, all the majority class samples may participate in the process of initial training and the online update of the model. Finally, a better SSD failure prediction performance is obtained by fusing all base classification models.

The failure prediction method for the storage device according to the embodiment of the present disclosure is described above with reference to FIGS. 1 to 11, and a failure prediction device for a storage device or a storage system according to the embodiment of the present disclosure is described below with reference to FIGS. 12-19.

Figure 12:
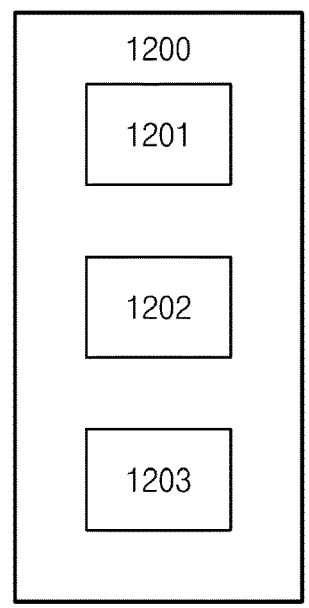
FIG. 12 is a block diagram illustrating the structure of a failure prediction device 1100 for a storage device according to an embodiment of the present disclosure.

FIG. 12 is a block diagram illustrating a failure prediction device 1200 for a storage device according to an embodiment of the present disclosure. Referring to FIG. 12, the failure prediction device may include a classification unit 1201, an initial determination unit 1202, and a final determination unit 1203.

As an example, the classification unit 1201 may be configured to input SMART data of the storage device obtained in real time into each base classification model of a plurality of base classification models to obtain a classification result for the SMART data of the storage device obtained in real time that is output by the each classification model, wherein each base classification model is obtained by training using historical SMART data of a plurality of storage devices and/or SMART data of the plurality of storage devices obtained online.

As an example, the initial determination unit 1202 may be configured to determine whether the SMART data of the storage device obtained in real time is healthy data or erroneous data, based on classification results of the plurality of base classification models.

As an example, the final determination unit 1203 may be configured to predict whether the storage device will fail, based on a number of SMART data that is determined as healthy data and a number of SMART data that is determined as erroneous data among SMART data of the storage device obtained within a predetermined time window.

As an example, each base classification model is an initial base classification model that is obtained by training using all of erroneous data in the historical SMART data of the plurality of storage devices and a first subset of healthy data in the historical SMART data, wherein the healthy data in the historical SMART data is divided into a plurality of first subsets, wherein the plurality of first subsets do not cross or overlap each other.

As an example, each base classification model is an updated base classification model that is obtained by training and updating the initial base classification model using SMART data of the plurality of storage devices obtained online, wherein, training data used to obtain the each updated classification model is a second subset corresponding to each updated classification model of the earliest obtained SMART data in a SMART data queue for storage device in a healthy state among the plurality of storage device that was recently acquired before current time, and SMART data in a SMART data queue for storage device in a failure state among the plurality of storage device that was recently acquired before the current time, wherein the SMART data queue has a predetermined size, wherein the earliest obtained SMART data in a SMART data queue for storage device in a healthy state among the plurality of storage device that was recently acquired before current time is divided into a plurality of second subsets, and the plurality of second subsets do not cross or overlap each other.

As an example, the each base classification model is a Long Short-Term Memory (LSTM) model.

As an example, the failure prediction device further includes a training unit (not shown) or a receiving unit (not shown).

As an example, the training unit may obtain the each base classification model through training.

As an example, the receiving unit may receive each trained base classification model from an external device.

As an example, the final determination unit 1203 may be configured to determine that the storage device will fail, when the number of SMART data determined as the erroneous data is greater than the number of SMART data determined as the healthy data within the predetermined time window; and/or, determine that the storage device will not fail, when the number of SMART data determined as the erroneous data is not greater than the number of SMART data determined as the healthy data within the predetermined time window.

As an example, a failure prediction system for a storage device is provided.

Figure 13:
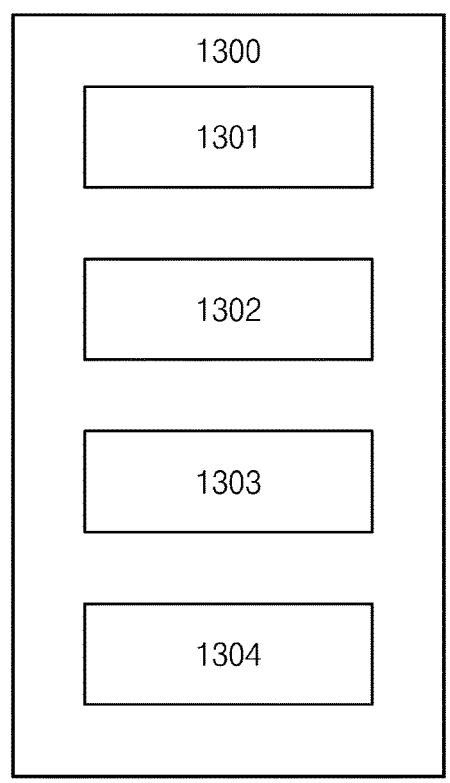
FIG. 13 is a structural block diagram illustrating a failure prediction system 1200 for a storage device according to an embodiment of the present disclosure.

FIG. 13 is a block diagram illustrating a failure prediction system 1300 for a storage device according to an embodiment of the present disclosure.

The failure prediction system 1300 may include a plurality of storage devices 1301, a classification unit 1302, an initial determination unit 1303, and a final determination unit 1304.

As an example, the classification unit 1302 may be configured to input SMART data of a storage device of the plurality of storage devices obtained in real time into each base classification model of a plurality of base classification models to obtain a classification result for the SMART data of the storage device obtained in real time that is output by the each classification model, wherein each base classification model is obtained by training using historical SMART data of the plurality of storage devices and/or SMART data of the plurality of storage devices obtained online.

As an example, the initial determination unit 1303 may be configured to determine whether the SMART data of the storage device obtained in real time is healthy data or erroneous data, based on classification results of the plurality of base classification models.

As an example, the final determination unit 1304 may be configured to predict whether the storage device will fail, based on a number of SMART data that is determined as healthy data and a number of SMART data that is determined as erroneous data among SMART data of the storage device obtained within a predetermined time window.

Figure 14:
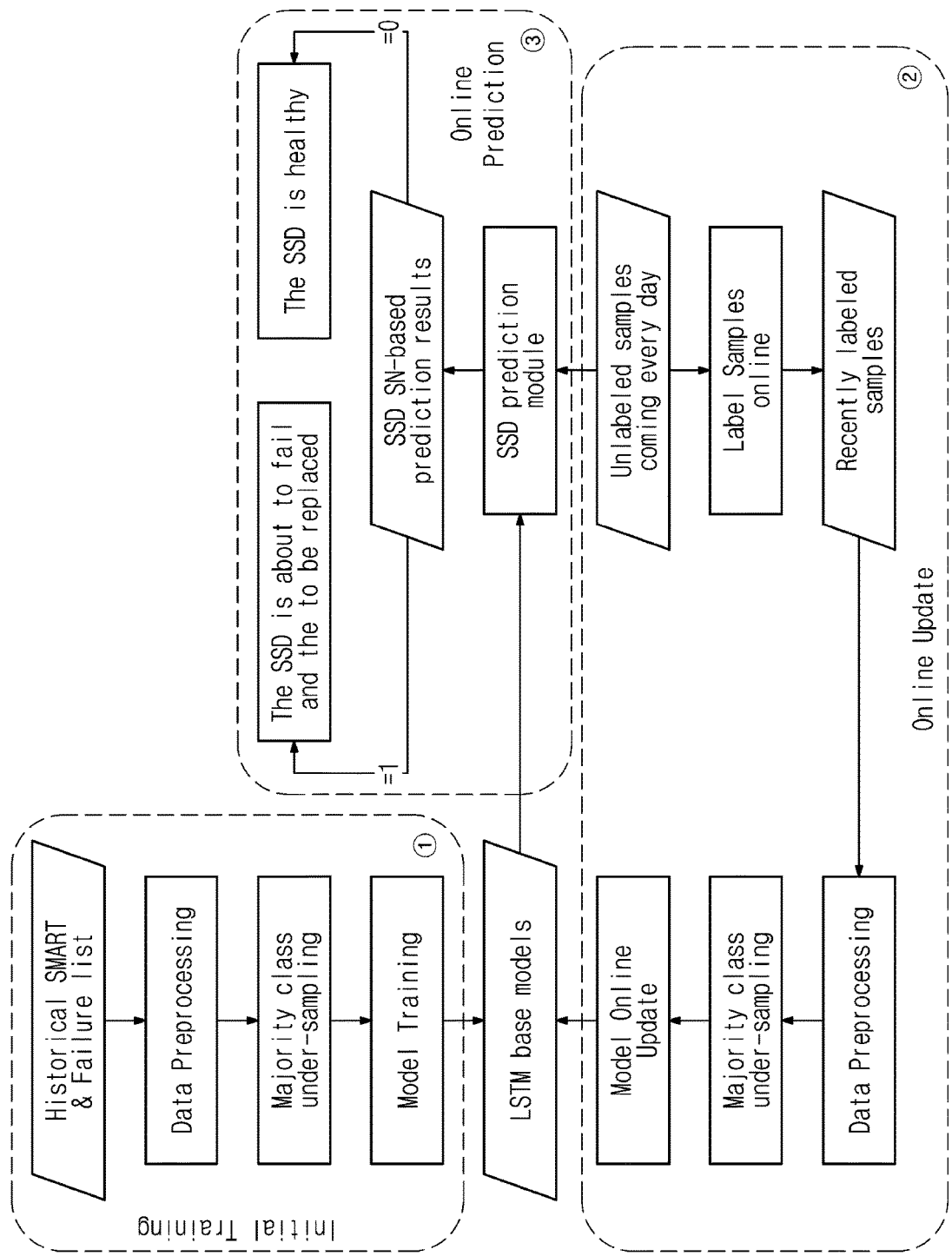
FIG. 14 is a block diagram illustrating a failure prediction apparatus for a storage device according to an embodiment of the present disclosure.

FIG. 14 is a block diagram illustrating a failure prediction apparatus for a storage device according to an embodiment of the present disclosure.

Referring to FIG. 14, the failure prediction device may include an initial training module ①, an online update module ②, and an online prediction module ③.

The initial training module ① obtains the initial base classification modes by using historical SMART data.

As an example, obtaining the initial base classification models may include the following 3 operations:

Data collection: collecting the historical SMART data of SSDs on the server that comprises SMART data of healthy SSDs and SMART data of failed SSDs, manually marking the historical SMART data, and storing the marked data in a database or a file.

Data preprocessing: preprocessing the training set, comprising missing value completion, standardization, etc.

Model training: train the models using the above-mentioned methods of majority class under-sampling ensemble learning.

The online update module ② trains the initial base classification models based on the SMART data obtained online to obtain an updated base classification models.

As an example, the online update process can include the following 3 operations:

Data collection and labeling: labeling new arrival data and temporarily storing them in the sample pool.

New data set preprocessing: preprocessing the training set, comprising missing value completion, standardization, etc.

Online update of models: using the majority-class sample under-sampling scheme to construct training samples for each base classification model, and updating each base classification model online.

The online prediction module ③ uses the updated base classification models to predict whether the SSD will fail.

In view of the problem of model aging caused by the change of SMART distribution over time in the SSD failure prediction, the SSD failure prediction scheme according to the embodiment of the present disclosure proposes an SSD failure prediction scheme based on online majority-class under-sampling ensemble learning by applying the online learning strategy to the SSD failure prediction task, and further optimizing the online learning prediction model with respect to the problem of imbalance of healthy data and erroneous data among the SMART data. The performance for SSD failure prediction is effectively improved by solving the problem of model aging and the distribution imbalance of healthy data and erroneous data among SMART data.

Figure 15:
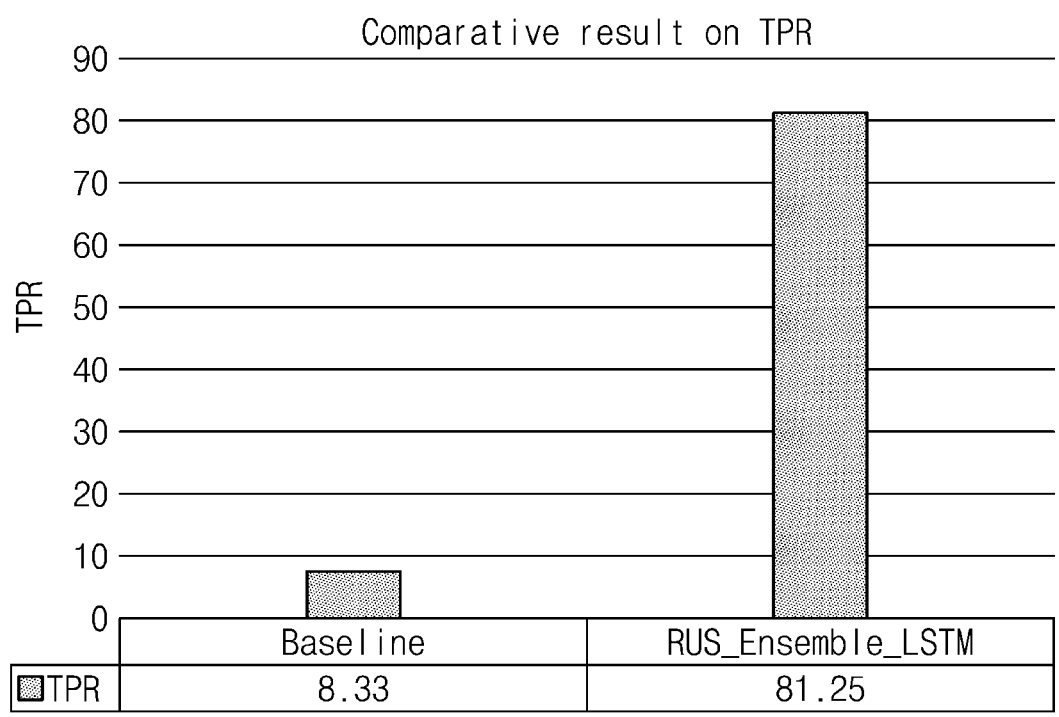
FIG. 15 is a diagram illustrating the prediction performances of an LSTM-based fault prediction scheme and a conventional LSTM-based algorithm according to an embodiment of the present disclosure.

FIG. 15 is a diagram illustrating the prediction performance of an LSTM-based failure prediction scheme according to an embodiment of the present disclosure and a conventional LSTM-based algorithm. Referring to FIG. 15, the performance of SSD failure prediction is evaluated based on the true positive rate (TPR) performance index. It can be seen from FIG. 15 that the under-sampling ensemble strategy according to the embodiment of the present disclosure may effectively improve the accuracy of SSD failure prediction.

Figure 16:
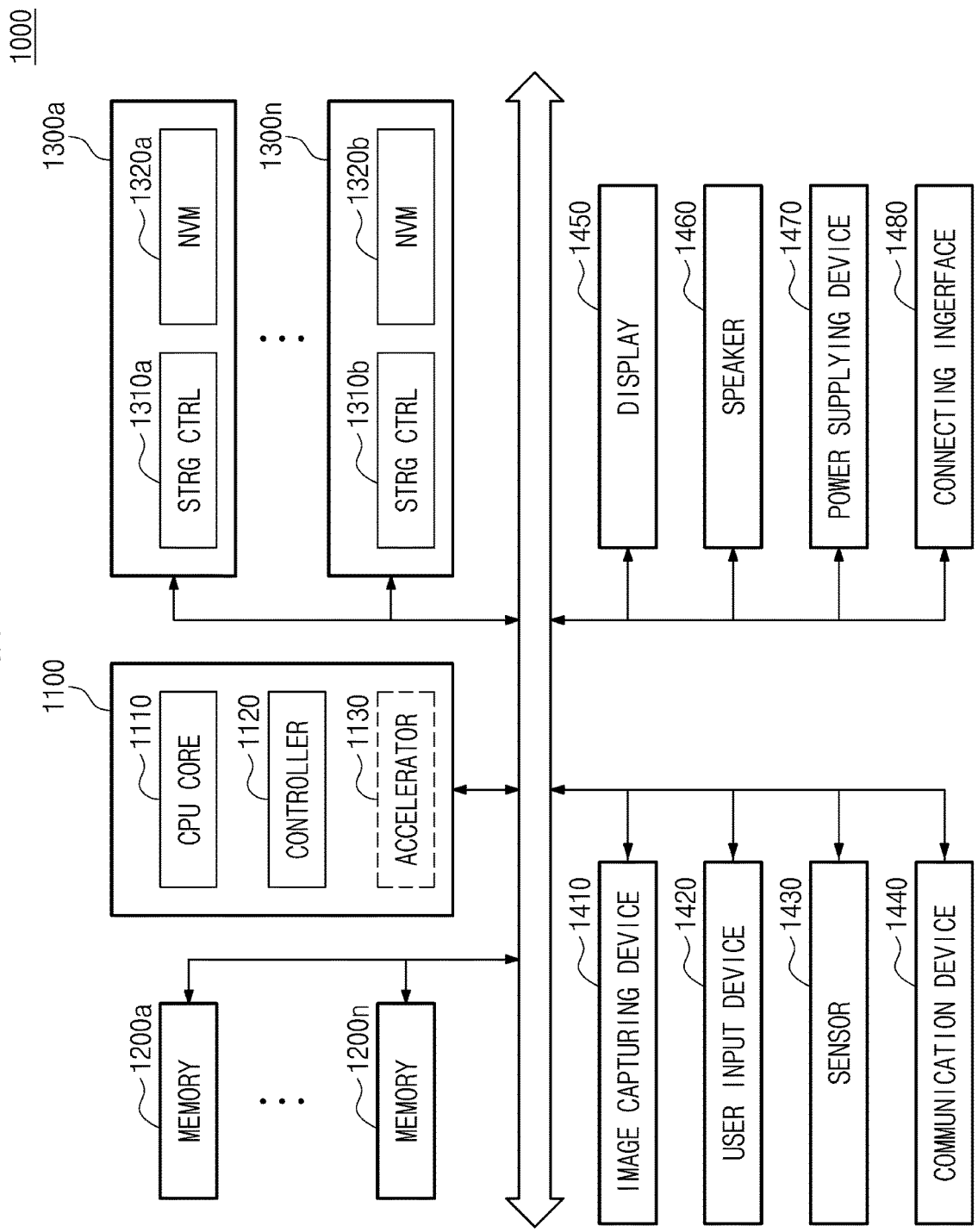
FIG. 16 is a schematic diagram of an electronic device 1000 according to an embodiment of the present disclosure.

FIG. 16 is a schematic diagram of an electronic device 1000 according to an embodiment of the present disclosure.

The system 1000 of FIG. 16 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 16 is not necessarily limited to the mobile system and may be a PC, a laptop computer, a server, a media player, or an automotive device (e.g., a navigation device).

Referring to FIG. 16, the system 1000 may include a main processor 1100, memories (e.g., 1200*a* through 1200*n*), and storage devices (e.g., 1300*a* through 1300*n*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* through 1200*n* and/or the storage devices 1300*a* through 1300*n*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* through 1200*n* may be used as main memory devices of the system 1000. Although each of the memories 1200*a* through 1200*n* may include a volatile memory, such as static random access memory (SRAM) and/or dynamic RAM (DRAM), each of the memories 1200*a* through 1200*n* may include non-volatile memory, such as a flash memory, phase-change RAM (PRAM) and/or resistive RAM (RRAM). The memories 1200*a* through 1200*n* may be implemented in the same package as the main processor 1100.

The storage devices 1300*a* through 1300*n* may serve as non-volatile storage devices configured to store data regardless of whether power is supplied thereto, and have larger storage capacity than the memories 1200*a* through 1200*n*. The storage devices 1300*a* through 1300*n* may respectively include storage controllers(STRG CTRL) 1310*a* through 1310*n* and NVM(Non-Volatile Memory)s 1320*a* through 1320*n* configured to store data via the control of the storage controllers 1310*a* through 1310*n*. Although the NVMs 1320*a* through 1320*n* may include flash memories having a two-dimensional (2D) structure or a three-dimensional (3D) V-NAND structure, the NVMs 1320*a* through 1320*n* may include other types of NVMs, such as PRAM and/or RRAM.

The storage devices 1300*a* through 1300*n* may be physically separated from the main processor 1100 and included in the system 1000 or implemented in the same package as the main processor 1100. In addition, the storage devices 1300a through 1300n may have types of solid-state devices (SSDs) or memory cards and be removably combined with other components of the system 100 through an interface, such as the connecting interface 1480 that will be described below. The storage devices 1300a through 1300n may be devices to which a standard protocol, such as a universal flash storage (UFS), an embedded multi-media card (eMMC), or a non-volatile memory express (NVMe), is applied, without being limited thereto.

The image capturing device 1480 may capture still images or moving images. The image capturing device 1480 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to an embodiment of the present disclosure, there is provided a storage system, comprising: a memory (for example, 1200a through 1200n in FIG. 16) storing one or more instructions; and a plurality of storage devices (for example, 1300a through 1300n in FIG. 16) 1300b); and a main processor (for example, 1100 in FIG. 16) configured to execute the one or more instructions to perform the failure prediction method for the storage device as described above.

For example, the main processor (1100 in FIG. 16) is configured to execute the one or more instructions to input SMART data of a storage device of a plurality of storage device obtained in real time into each base classification model of a plurality of base classification models to obtain a classification result for the SMART data of the storage device obtained in real time that is output by the each classification model, wherein each base classification model is obtained by training using historical SMART data of the plurality of storage devices and/or SMART data of the plurality of storage devices obtained online; determine whether the SMART data of the storage device obtained in real time is healthy data or erroneous data, based on classification results of the plurality of base classification models; predict whether the storage device will fail, based on a number of SMART data that is determined as healthy data and a number of SMART data that is determined as erroneous data among SMART data of the storage device obtained within a predetermined time window.

Figure 17:
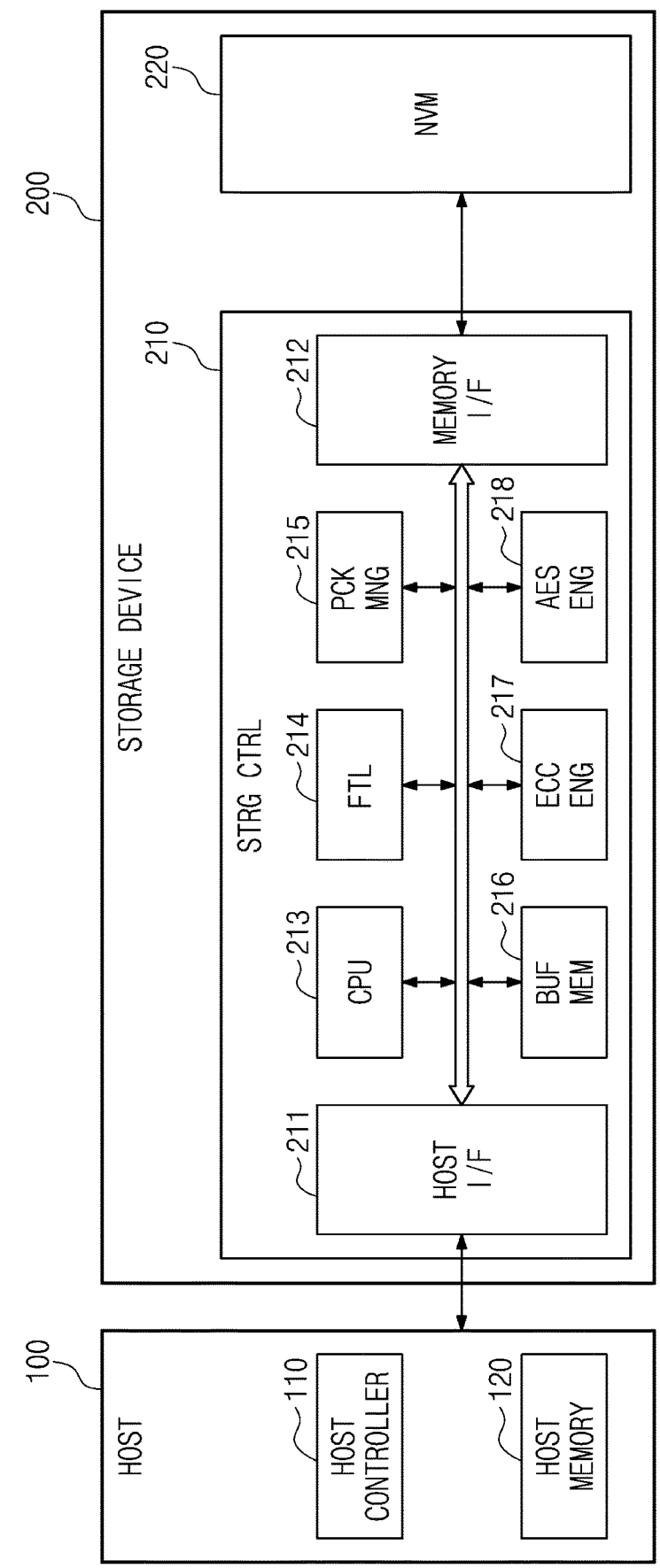
FIG. 17 is a block diagram of a host storage system according to an embodiment of the present disclosure.

FIG. 17 is a block diagram of the host storage system according to an embodiment of the present disclosure.

The host storage system may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

According to an embodiment of the present disclosure, a host storage system is provided, comprising: a host (for example, 100 in FIG. 17), comprising a host memory (for example, 110 in FIG. 17) and a host controller (for example, in FIG. 17 120); and a storage device (for example, 200 in FIG. 17), wherein the host memory stores instructions, when executed by the host controller, executing the failure prediction method for the storage device as described above.

For example, the host memory stores instructions, when executed by the host controller, to input SMART data of a storage device obtained in real time into each base classification model of a plurality of base classification models to obtain a classification result for the SMART data of the storage device obtained in real time that is output by the each classification model, wherein each base classification model is obtained by training using historical SMART data of a plurality of storage devices and/or SMART data of the plurality of storage devices obtained online; determine whether the SMART data of the storage device obtained in real time is healthy data or erroneous data, based on classification results of the plurality of base classification models; predict whether the storage device will fail, based on a number of SMART data that is determined as healthy data and a number of SMART data that is determined as erroneous data among SMART data of the storage device obtained within a predetermined time window.

Figure 18:
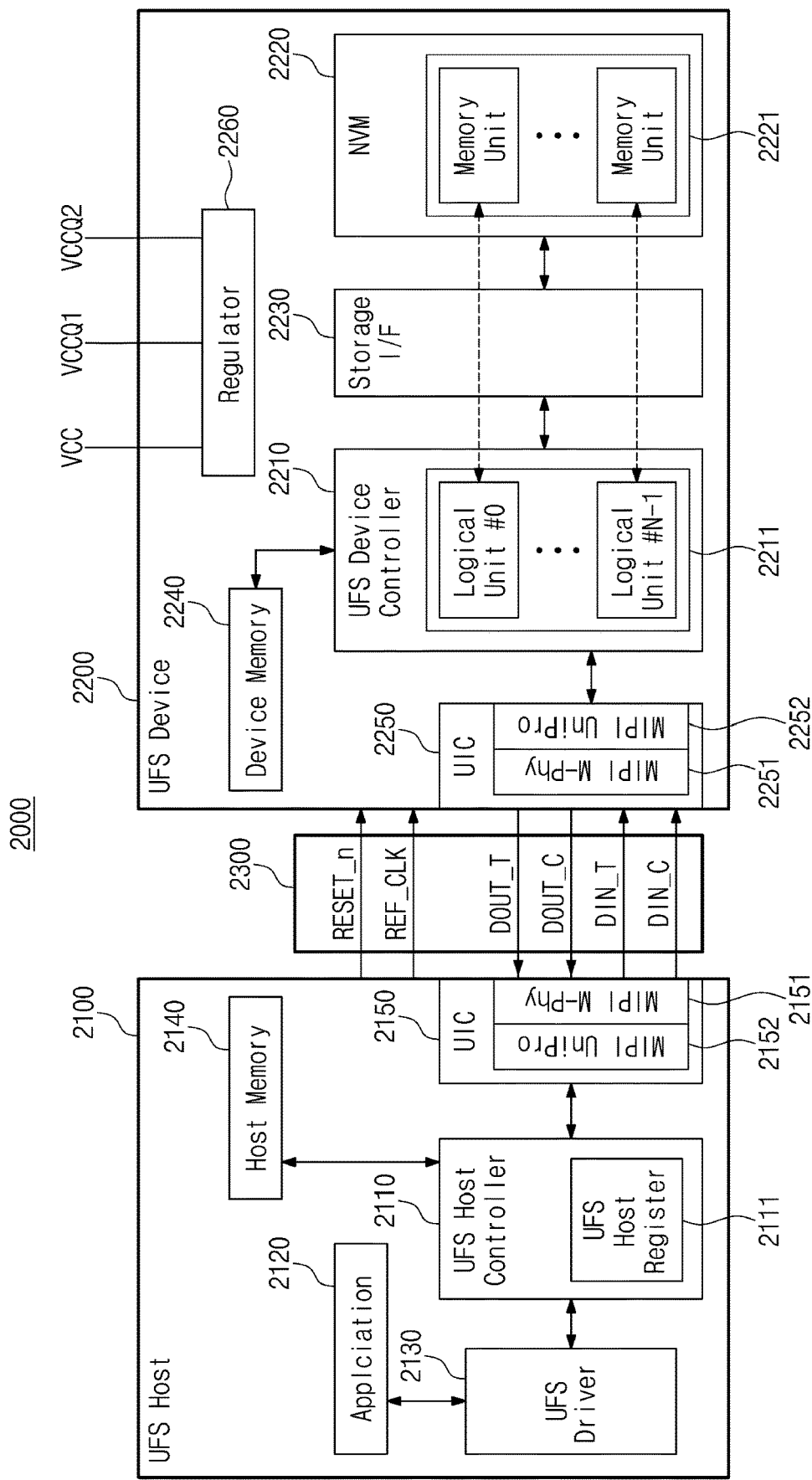
FIG. 18 is a block diagram of a Universal Flash Storage (UFS) system 2000 according to an embodiment of the present disclosure.

FIG. 18 is a block diagram of a UFS system 2000 according to an embodiment of the present disclosure.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 18 within a range that does not conflict with the following description of FIG. 18.

Referring to FIG. 18, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200a through 1200n of FIG. 16. The UFS device 2200 may correspond to the storage device 1300a through 1300n of FIG. 16, and a UFS device controller 2210 and an NVM 2220 may respectively correspond to the storage controllers 1310a through 1310n and the NVMs 1320a through 1320n of FIG. 16.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 18, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 18, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

According to an embodiment of the present disclosure, a UFS system is provided, comprising: a UFS device (2200 in FIG. 18); a UFS host (for example, 2100 in FIG. 18); and a UFS interface (2300 in FIG. 18), used for a communication between the UFS device and the UFS host, the UFS host is configured to execute the failure prediction method for the storage device as described above.

For example, the UFS host may be configured to input, through the UFS interface, SMART data of the UFS device obtained in real time into each base classification model of a plurality of base classification models to obtain a classification result for the SMART data of the UFS device obtained in real time that is output by the each classification model, wherein each base classification model is obtained by training using historical SMART data of a plurality of UFS devices and/or SMART data of the plurality of UFS devices obtained online; determine whether the SMART data of the UFS device obtained in real time is healthy data or erroneous data, based on classification results of the plurality of base classification models; predict whether the UFS device will fail, based on a number of SMART data that is determined as healthy data and a number of SMART data that is determined as erroneous data among SMART data of the UFS device obtained within a predetermined time window.

Those skilled in the art should understand that the main processor in FIG. 16, the host in FIG. 17, and the UFS host in FIG. 18 can be used to execute the storage device failure prediction method described herein. Since the failure prediction method for the storage device has been described in detail above, it will not be repeated here.

According to an embodiment of the present disclosure, there is provided a storage system comprising: a storage device (for example, 17 in FIG. 5) comprising a plurality of non-volatile memories NVMs(for example, VNM11-VNMmn in FIG. 5); and a memory controller (for example, 16 in FIG. 5), configured to input SMART data of a NVM of a plurality of NVM obtained in real time into each base classification model of a plurality of base classification models to obtain a classification result for the SMART data of the NVM obtained in real time that is output by the each classification model, wherein each base classification model is obtained by training using historical SMART data of the plurality of NVMs and/or SMART data of the plurality of NVMs obtained online; determine whether the SMART data of the NVM obtained in real time is healthy data or erroneous data, based on classification results of the plurality of base classification models; predict whether the NVM will fail, based on a number of SMART data that is determined as healthy data and a number of SMART data that is determined as erroneous data among SMART data of the NVM obtained within a predetermined time window.

According to an embodiment of the present disclosure, a data center system (for example, 3000 in FIG. 6) is provided, comprising: a plurality of application servers (for example, application servers 1-N in FIG. 6); and a plurality of storage servers (for example, storage server 1-M in FIG. 6), wherein each storage server includes a storage device (for example, 3250-3250m in FIG. 6), wherein one of plurality of storage servers is configured to perform the failure prediction method for the storage device as described above.

For example, one of the plurality of application servers may be configured to input SMART data of a storage device one of the plurality of storage servers obtained in real time into each base classification model of a plurality of base classification models to obtain a classification result for the SMART data of the storage device obtained in real time that is output by the each classification model, wherein each base classification model is obtained by training using historical SMART data of a plurality of storage devices of the plurality of storage servers and/or SMART data of the plurality of storage devices of the plurality of storage servers obtained online; determine whether the SMART data of the storage device obtained in real time is healthy data or erroneous data, based on classification results of the plurality of base classification models; predict whether the storage device will fail, based on a number of SMART data that is determined as healthy data and a number of SMART data that is determined as erroneous data among SMART data of the storage device obtained within a predetermined time window According to an exemplary embodiment of the present disclosure, there is provided a computer-readable storage medium storing a computer program, when executed by a processor, implementing the failure prediction method for the storage device as described above.

Figure 19:
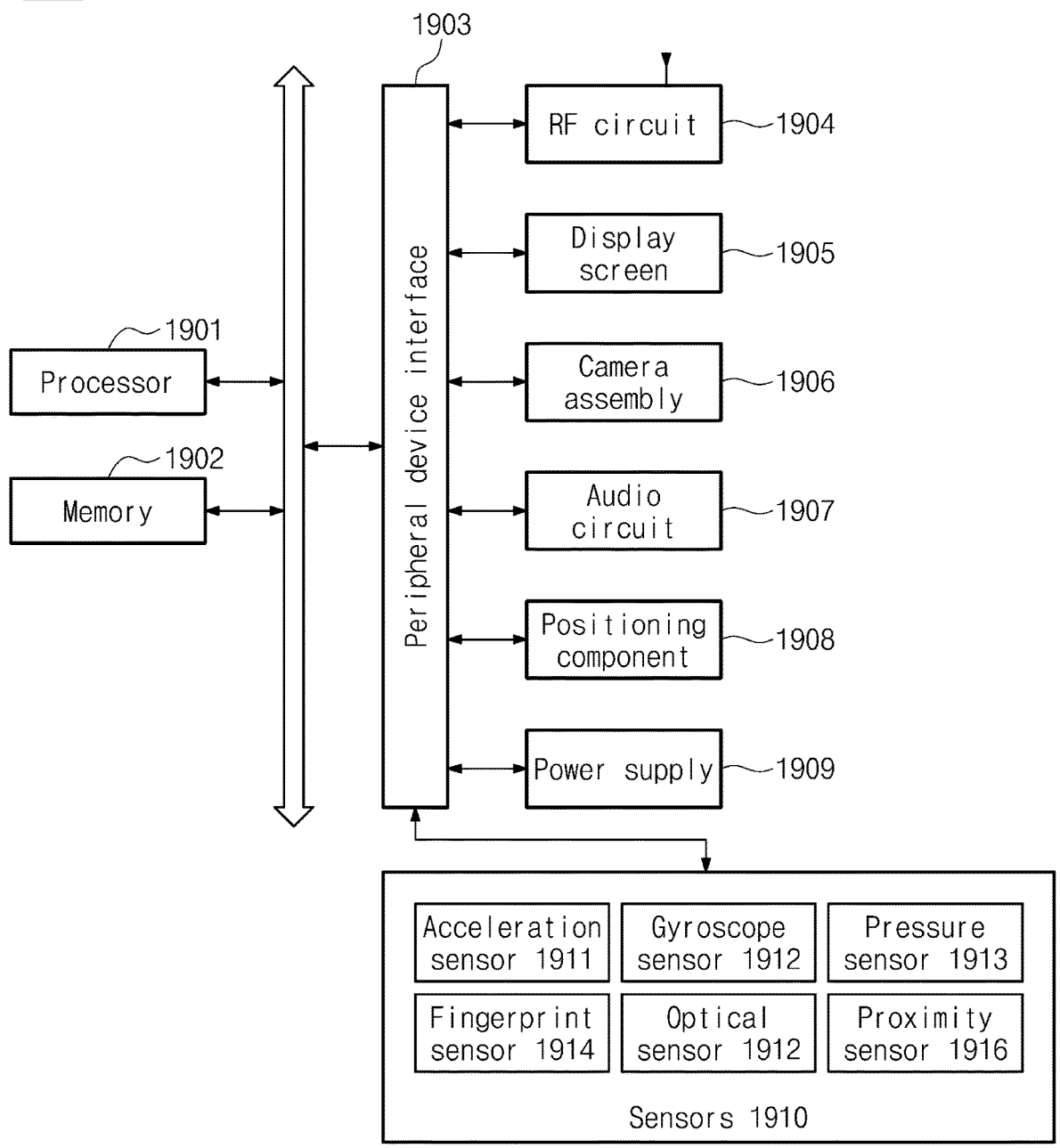
FIG. 19 is a block diagram illustrating the structure of a failure prediction device for a storage device according to an exemplary embodiment of the present disclosure.

FIG. 19 is a structural block diagram illustrating a failure prediction device for a storage device according to an exemplary embodiment of the present disclosure. The failure prediction device 1900 may be, for example, a smart phone, a tablet computer, an MP3 (Moving Picture Experts Group Audio Layer III) player, MP4 (Moving Picture Experts Group Audio Layer IV) Player, laptop or desktop computer. The failure prediction device 1900 may also be called user equipment, portable terminal, laptop terminal, desktop terminal and other names.

Generally, the failure prediction device 1900 includes a processor 1901 and a memory 1902.

The processor 1901 may include one or more processing cores, such as a 4-cores processor, an 8-cores processor, and so on. The processor 1001 may be implemented in at least one hardware form of DSP (Digital Signal Processing), FPGA (Field Programmable Gate Array), PLA (Programmable Logic Array). The processor 1901 may also include a main processor and a slave processor. The main processor is a processor used to process data in a awake state, also called a CPU (Central Processing Unit); the slave processor is a low-power processor used to process data in a standby state.

In some embodiments, the processor 1901 may be integrated with a GPU (Graphics Processing Unit) used to render and draw content that needs to be displayed on the display screen. In some embodiments, the processor 1901 may further include an AI (Artificial Intelligence) processor used to process calculation operations related to machine learning.

The memory 1902 may include one or more computer-readable storage media, which may be non-transitory. The memory 1902 may also include a high-speed random access memory and a non-volatile memory, such as one or more magnetic disk storage devices and flash memory storage devices. In some embodiments, the non-transitory computer-readable storage medium in the memory 1902 is used to store at least one instruction used to be executed by the processor 1901 to implement the method for acquiring the floor map of the room layout in the present disclosure.

In some embodiments, the failure prediction device 1900 may optionally further include: a peripheral device interface 1903 and at least one peripheral device. The processor 1901, the memory 1902, and the peripheral device interface 1903 may be connected by a bus or a signal line. Each peripheral device may be connected to the peripheral device interface 1903 through a bus, a signal line, or a circuit board. Specifically, the peripheral devices includes: a radio frequency circuit 1904, a touch screen 1905, a camera 1906, an audio circuit 1907, a positioning component 1908, and a power supply 1909.

The peripheral device interface 1903 may be used to connect at least one peripheral device related to I/O (Input/Output) to the processor 1901 and the memory 1902. In some embodiments, the processor 1901, the memory 1902, and the peripheral device interface 1903 are integrated on the same chip or circuit board; in some other embodiments, any one or two of the processor 1901, the memory 1902, and the peripheral device interface 1903 may be implemented on a separate chip or circuit board, which is not limited in this embodiment.

The radio frequency circuit 1904 is used for receiving and transmitting RF (Radio Frequency) signals, also called electromagnetic signals. The radio frequency circuit 1904 communicates with a communication network and other communication devices through electromagnetic signals. The radio frequency circuit 1904 converts electrical signals into electromagnetic signals for transmission, or converts received electromagnetic signals into electrical signals. Alternatively, the radio frequency circuit 1904 includes: an antenna system, an RF transceiver, one or more amplifiers, a tuner, an oscillator, a digital signal processor, a codec chipset, a user identity module card, and so on. The radio frequency circuit 1904 can communicate with other terminals through at least one wireless communication protocol. The wireless communication protocol includes, but is not limited to: metropolitan area networks, various generations of mobile communication networks (2G, 3G, 4G, and 5G), wireless local area networks and/or Wi-Fi (Wireless Fidelity) networks. In some embodiments, the radio frequency circuit 1904 may also include a circuit related to NFC (Near Field Communication), which is not limited in the present disclosure.

The display screen 1905 is used to display a UI (User Interface). The UI may include graphics, text, icons, videos, and any combination thereof. When the display screen 1905 is a touch display screen, the display screen 1905 also has an ability to collect touch signals on or above the surface of the display screen 1905. The touch signal may be input to the processor 1901 as a control signal for processing. At this time, the display screen 1905 may also be used to provide virtual buttons and/or virtual keyboards, also called soft buttons and/or soft keyboards. In some embodiments, the display screen 1905 may be one display screen, which is arranged on the front panel of the failure prediction device 1900; in other embodiments, the display screen 1905 may be at least two display screens 1905, which are respectively arranged on different surfaces of the terminal 1000 or in a folded design. In still other embodiments, the display screen 1905 may be a flexible display screen, which is arranged on the curved surface or the folding surface of the failure prediction device 1900. Furthermore, the display screen 1905 may also be set as a non-rectangular irregular shape, that is, a special-shaped screen. The display screen 1905 may be made of materials such as LCD (Liquid Crystal Display), OLED (Organic Light-Emitting Diode).

The camera assembly 1906 is used to capture images or videos. Alternatively, the camera assembly 1906 includes a front camera and a rear camera. Generally, the front camera is set on the front panel of the terminal, and the rear camera is set on the back of the terminal. In some embodiments, the rear camera is at least two cameras, each of which is a main camera, a depth-of-field camera, a wide-angle camera, and a telephoto camera, so as to realize a fusion of the main camera and the depth-of-field camera to realize the background blur function, a fusion of the main camera and the wide-angle camera to realize panoramic shooting and VR (Virtual Reality) shooting function or other fusion shooting functions. In some embodiments, the camera assembly 1906 may also include a flash. The flash may be a single-color temperature flash or a dual-color temperature flash. Dual color temperature flash refers to a combination of warm light flash and cold light flash, which may be used for light compensation under different color temperatures.

The audio circuit 1907 may include a microphone and a speaker. The microphone is used to collect sound waves of the user and the environment, and convert the sound waves into electrical signals and input them to the processor 1901 for processing, or input to the radio frequency circuit 1904 to implement voice communication. For the purpose of stereo collection or noise reduction, there may be multiple microphones, which are respectively set in different parts of the failure prediction device 1900. The microphone may also be an array microphone or an omnidirectional collection microphone. The speaker is used to convert the electrical signal from the processor 1901 or the radio frequency circuit 1904 into sound waves. The speaker may be a traditional thin-film speaker or a piezoelectric ceramic speaker. When the speaker is a piezoelectric ceramic speaker, it may not only convert electrical signals into sound waves that are audible to humans, but also convert electrical signals into sound waves that are inaudible to humans for distance measurement and other purposes. In some embodiments, the audio circuit 1907 may also include a headphone jack.

The positioning component 1908 is used to locate a current geographic location of the failure prediction device 1900 to implement navigation or LBS (Location Based Service). The positioning component 1908 may be a positioning component based on the GPS (Global Positioning System) of the United States, the Beidou system of China, the GLONASS system of Russia, or the Galileo system of the European Union.

The power supply 1909 is used to supply power to various components in the failure prediction device 1900. The power supply 1909 may be alternating current, direct current, disposable batteries, or rechargeable batteries. When the power supply 1909 includes a rechargeable battery, the rechargeable battery may support wired charging or wireless charging. The rechargeable battery may also be used to support fast charging technology.

In some embodiments, the failure prediction device 1900 further includes one or more sensors 1910. The one or more sensors 1910 include, but are not limited to: an acceleration sensor 1911, a gyroscope sensor 1912, a pressure sensor 1913, a fingerprint sensor 1914, an optical sensor 1915, and a proximity sensor 1916.

The acceleration sensor 1911 may detect the magnitude of acceleration on the three coordinate axes of the coordinate system established by the terminal 1900. For example, the acceleration sensor 1911 may be used to detect the components of gravitational acceleration on three coordinate axes. The processor 1901 may control the touch screen 1905 to display the user interface in a horizontal view or a vertical view according to the gravity acceleration signal obtained by the acceleration sensor 1911. The acceleration sensor 1911 may also be used for the collection of game or user motion data.

The gyroscope sensor 1912 may detect the body direction and rotation angle of the failure prediction device 1900, and the gyroscope sensor 1912 may cooperate with the acceleration sensor 1911 to obtain the user's 3D actions on the failure prediction device 1900. The processor 1901 may implement the following functions according to the data obtained by the gyroscope sensor 1912: motion sensing (for example, changing the UI according to the user's tilt operation), image stabilization during shooting, game control, and inertial navigation.

The pressure sensor 1913 may be disposed on a side frame of the failure prediction device 1900 and/or the lower layer of the touch screen 1905. When the pressure sensor 1913 is arranged on the side frame of the failure prediction device 1900, the user's holding signal for the terminal 1900 may be detected, and the processor 1901 performs left and right hand recognition or quick operation according to the holding signal obtained by the pressure sensor 1913. When the pressure sensor 1913 is arranged on the lower layer of the touch display screen 1905, the processor 1901 controls a operability control element on the UI according to the user's pressure operation on the touch display screen 1905. The operability control element includes at least one of a button control element, a scroll bar control element, an icon control element, and a menu control element.

The fingerprint sensor 1914 is used to obtain a user's fingerprint, and the processor 1901 identifies the user's identity according to the fingerprint obtained by the fingerprint sensor 1914, or the fingerprint sensor 1914 identifies the user's identity according to the obtained fingerprint. When it is recognized that the user's identity is a trusted identity, the processor 1901 authorizes the user to perform related sensitive operations, including unlocking a screen, viewing encrypted information, downloading software, paying, and changing settings. The fingerprint sensor 1914 may be provided on the front, back or side of the failure prediction device 1900. When the failure prediction device 1900 is provided with a physical button or a manufacturer logo, the fingerprint sensor 1914 may be integrated with the physical button or the manufacturer logo.

The optical sensor 1915 is used to obtain the ambient light intensity. In an embodiment, the processor 1901 may control the display brightness of the touch screen 1905 according to the intensity of the ambient light obtained by the optical sensor 1915. Specifically, when the ambient light intensity is high, the display brightness of the touch display screen 1905 is increased; when the ambient light intensity is low, the display brightness of the touch display screen 1905 is decreased. In another embodiment, the processor 1901 may also dynamically adjust the shooting parameters of the camera assembly 1906 according to the ambient light intensity obtained by the optical sensor 1915.

The proximity sensor 1916, also called a distance sensor, is usually arranged on a front panel of the failure prediction device 1900. The proximity sensor 1916 is used to obtain a distance between the user and the front of the failure prediction device 1900. In one embodiment, when the proximity sensor 1916 detects that the distance between the user and the front of the failure prediction device 1900 gradually decreases, the processor 1901 controls the touch screen 1905 to switch from on-screen state to off-screen state; when the proximity sensor 1916 detects that the distance between the user and the front of the failure prediction device 1900 gradually increases, the processor 1901 controls the touch display screen 1905 to switch from the off-screen state to the on-screen state.

Those skilled in the art may understand that the structure shown in FIG. 6 does not constitute a limitation on the failure prediction device 1900, and may include more or fewer components than shown, or combine certain components, or adopt different component arrangements.

According to an embodiment of the present disclosure, there may also be provided a computer-readable storage medium storing instructions, when executed by at least one processor, causing the at least one processor to execute the failure prediction method for a storage device according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to the embodiments of the present disclosure, a computer program product may also be provided, and instructions in the computer program product may be executed by a processor of a computer device to complete the failure prediction method for a storage device.

The method, device, electronic apparatus, and computer-readable storage medium for a prediction for failure of a storage device according to the embodiments of the present disclosure can draw the floor map of the room layout more accurately.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only, and the actual scope and spirit of the present disclosure are pointed out by the following claims.

What is claimed:

1. A failure prediction method for a storage device, comprising:
   inputting Self-Monitoring, Analysis, and Reporting Technology (SMART) data of the storage device obtained in real time, into each of a plurality of base classification models;
   obtaining a plurality of classification results from the plurality of base classification models, for the SMART data of the storage device, wherein each of the plurality of base classification models is obtained by training using at least one of historical SMART data of a plurality of storage devices or SMART data of the plurality of storage devices obtained through a network;
   determining whether the SMART data of the storage device obtained in real time indicates healthy data or erroneous data, based on the plurality of classification results of the plurality of base classification models; and
   predicting whether the storage device will fail, based on a number of SMART data that is determined as the healthy data and a number of SMART data that is determined as the erroneous data among SMART data of the storage device obtained within a predetermined time window.

2. The method of claim 1, wherein each of the plurality of base classification models is an initial base classification model that is obtained by training using all of erroneous data in the historical SMART data of the plurality of storage devices and a first subset of healthy data corresponding to the each of the plurality of base classification models among the historical SMART data, wherein the healthy data among the historical SMART data is divided into a plurality of first subsets which do not overlap.

3. The method of claim 2, wherein each of the plurality of base classification models is an updated base classification model that is obtained through training and updating the initial base classification model by using the SMART data of the plurality of storage devices obtained through the network,
   wherein training data used to obtain each updated classification model is:
      a second subset corresponding to the each updated classification model of earliest obtained SMART data in a SMART data queue for a storage device in a healthy state among the plurality of storage devices, which was obtained before a current time, and SMART data in a SMART data queue for a storage device in a failure state among the plurality of storage devices, which was obtained before the current time,
   wherein the SMART data queue has a predetermined size, and
   wherein the earliest obtained SMART data in the SMART data queue for a storage device in the healthy state among the plurality of storage devices that was obtained before the current time is divided into a plurality of second subsets which do not overlap.

4. The method of claim 1, wherein each of the plurality of base classification models is a Long Short-Term Memory (LSTM) model.

5. The method of claim 2, further comprising:
   obtaining each of the plurality of base classification models through training or by receiving from an external device.

6. The method of claim 1, wherein the predicting whether the storage device will fail comprises at least one of:
   determining that the storage device will fail, when a number of the SMART data determined as the erroneous data is greater than a number of the SMART data determined as the healthy data within the predetermined time window; or
   determining that the storage device will not fail, when the number of the SMART data determined as the erroneous data is not greater than the number of the SMART data determined as the healthy data within the predetermined time window.

7. A failure prediction device for a storage device, comprising:
   a memory storing instructions; and
   a processor configured to execute the instructions to:
      input Self-Monitoring, Analysis, and Reporting Technology (SMART) data of the storage device obtained in real time into each of a plurality of base classification models to obtain a classification result for the SMART data of the storage device obtained in real time that is output by each of the plurality of base classification models, wherein each of the plurality of base classification models is obtained by training using at least one of historical SMART data of a plurality of storage devices or SMART data of the plurality of storage devices obtained through a network;
      determine whether the SMART data of the storage device obtained in real time is healthy data or erroneous data, based on classification results of the plurality of base classification models; and
      predict whether the storage device will fail, based on a number of SMART data that is determined as the healthy data and a number of SMART data that is determined as the erroneous data among SMART data of the storage device obtained within a predetermined time window.

8. A failure prediction system for storage devices, comprising:
   a plurality of storage devices;
   a memory storing instructions; and
   processor configured to execute the instructions to:
      input Self-Monitoring, Analysis, and Reporting Technology (SMART) data of a storage device of the plurality of storage devices obtained in real time, into each of a plurality of base classification models;
      obtain a plurality of classification results from the plurality of base classification models, for the SMART data of the storage device, wherein each of the plurality of base classification models is obtained by training using at least one of historical SMART data of the plurality of storage devices or SMART data of the plurality of storage devices obtained through a network;

determine whether the SMART data of the storage device obtained in real time is healthy data or erroneous data, based on the plurality of classification results of the plurality of base classification models; and predict whether the storage device will fail, based on a number of SMART data that is determined as the healthy data and a number of SMART data that is determined as the erroneous data among SMART data of the storage device obtained within a predetermined time window.

9. An electronic device, comprising:

a memory configured to store one or more instructions;

a plurality of storage devices; and a main processor configured to execute the one or more instructions to perform the failure prediction method for the storage device of claim 1.

10. A host storage system, comprising:

a host comprising a host memory and a host controller; and a storage device, wherein the host memory stores instructions which, when executed by the host controller, perform the failure prediction method for the storage device of claim 1.

11. A Universal Flash Storage (UFS) system, comprising:

a UFS device;

a UFS host; and a UFS interface used for a communication between the UFS device and the UFS host, wherein the UFS host is configured to performing the failure prediction method for the storage device of claim 1.

12. A storage system, comprising:

a storage device comprising a plurality of non-volatile memories (NVMs); and a memory controller configured to perform the failure prediction method for the storage device of claim 1.

13. A data center system, comprising:

a plurality of application servers; and a plurality of storage servers, wherein each storage server comprises a storage device, wherein one of the plurality of application servers is configured to execute the failure prediction method for the storage device of claim 1.

14. A non-transitory computer-readable storage medium storing a computer program, when executed by a processor, causing the processor to implement the failure prediction method for the storage device of claim 1.

* * * * *